(12) United States Patent
Laroia et al.

(10) Patent No.: US 8,521,194 B2
(45) Date of Patent: *Aug. 27, 2013

(54) PERFORMING PAGING IN A WIRELESS PEER-TO-PEER NETWORK

(75) Inventors: Rajiv Laroia, Far Hills, NJ (US);
Aleksandar Jovicic, Urbana, IL (US);
Junyi Li, Bedminster, NJ (US); Thomas Richardson, South Orange, NJ (US);
Xinzhou Wu, Monmouth Junction, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1338 days.

This patent is subject to a terminal disclaimer.

(21) Appl. No.: 11/775,461

(22) Filed: Jul. 10, 2007

(65) Prior Publication Data
US 2009/0017843 A1 Jan. 15, 2009

(51) Int. Cl.
*H04W 68/00* (2009.01)
(52) U.S. Cl.
USPC .......... 455/458; 455/41.2; 455/517; 455/502; 370/329; 370/338
(58) Field of Classification Search
USPC ............ 455/458, 466, 41.2, 502, 517–519, 455/509; 370/329, 338, 352, 350
See application file for complete search history.

(56) References Cited

U.S. PATENT DOCUMENTS

| | | | |
|---|---|---|---|
| 5,537,415 A * | 7/1996 | Miller et al. | 370/314 |
| 5,903,618 A | 5/1999 | Miyake et al. | |
| 5,995,500 A * | 11/1999 | Ma et al. | 370/337 |
| 6,415,146 B1 | 7/2002 | Capece | |
| 6,580,704 B1 * | 6/2003 | Wellig et al. | 370/338 |
| 6,580,909 B1 | 6/2003 | Carro | |
| 6,678,341 B1 * | 1/2004 | Miyake et al. | 375/356 |
| 6,681,115 B1 * | 1/2004 | McKenna et al. | 455/517 |

(Continued)

FOREIGN PATENT DOCUMENTS

| | | |
|---|---|---|
| CN | 1527621 A | 9/2004 |
| EP | 1653697 A1 | 5/2006 |

(Continued)

OTHER PUBLICATIONS

International Search Report—PCT/US08/069080—International Search Authority, European Patent Office—Oct. 21, 2008.

(Continued)

*Primary Examiner* — Sharad Rampuria
(74) *Attorney, Agent, or Firm* — James K. O'Hare

(57) ABSTRACT

Systems and methodologies are described that facilitate paging within a peer-to-peer communication network. A first wireless terminal monitors the paging channel of a wide area network. When a second wireless terminal intends to establish a peer-to-peer connection with the first wireless terminal, the second wireless terminal generates a paging message and transfers the message to the WAN, which routes the paging message to a base station. The base station uses its paging channel to send a paging message to the target first wireless terminal. The paging message indicates to the target first wireless terminal that the second wireless terminal intends to establish a peer-to-peer connection with the first wireless terminal. The paging message may further include parameters to be used to establish the peer-to-peer connection. Upon reception of the paging message, the second wireless terminal sends a signal directly to the first wireless terminal to start the direct peer-to-peer communication.

96 Claims, 13 Drawing Sheets

(56) References Cited

U.S. PATENT DOCUMENTS

| | | | |
|---|---|---|---|
| 6,865,371 B2* | 3/2005 | Salonidis et al. | 455/41.1 |
| 6,865,372 B2* | 3/2005 | Mauney et al. | 455/41.2 |
| 6,968,153 B1* | 11/2005 | Heinonen et al. | 455/11.1 |
| 7,215,923 B2* | 5/2007 | Hillyard | 455/41.1 |
| 7,239,874 B2* | 7/2007 | Reddy et al. | 455/436 |
| 7,272,636 B2* | 9/2007 | Pabla | 709/216 |
| 7,286,841 B2* | 10/2007 | Sun et al. | 455/502 |
| 7,336,638 B2* | 2/2008 | Cheng et al. | 370/338 |
| 7,349,691 B2* | 3/2008 | Karr et al. | 455/422.1 |
| 7,567,540 B2* | 7/2009 | Sakoda | 370/338 |
| 7,684,813 B2* | 3/2010 | Benson et al. | 455/517 |
| 7,774,495 B2* | 8/2010 | Pabla et al. | 709/238 |
| 7,787,820 B2* | 8/2010 | Hillyard | 455/41.1 |
| 7,898,983 B2* | 3/2011 | Laroia et al. | 370/254 |
| 7,940,781 B2* | 5/2011 | Poustchi et al. | 370/401 |
| 7,961,708 B2* | 6/2011 | Li et al. | 370/350 |
| 8,285,207 B2* | 10/2012 | Kwon et al. | 455/41.2 |
| 2002/0147810 A1* | 10/2002 | Traversat et al. | 709/224 |
| 2003/0153343 A1* | 8/2003 | Crockett et al. | 455/519 |
| 2005/0220134 A1* | 10/2005 | Lin | 370/437 |
| 2006/0203790 A1 | 9/2006 | Hong et al. | |

FOREIGN PATENT DOCUMENTS

| | | |
|---|---|---|
| JP | 9107583 | 4/1997 |
| JP | 2006141004 A | 6/2006 |
| JP | 2006520158 A | 8/2006 |
| JP | 2006522533 A | 9/2006 |
| JP | 2008546259 | 12/2008 |
| JP | 2009512282 | 3/2009 |
| WO | 99004514 | 1/1999 |
| WO | WO2004080103 A1 | 9/2004 |
| WO | 2005053347 | 6/2005 |
| WO | WO 2005053347 A1 * | 6/2005 |
| WO | 2006075277 | 7/2006 |
| WO | WO2006081123 A2 | 8/2006 |
| WO | WO2007055993 A1 | 5/2007 |

OTHER PUBLICATIONS

Written Opinion—PCT/US08/069080—International Search Authority, European Patent Office—Oct. 21, 2008.

Taiwan Search Report—TW097124154—TIPO—Nov. 12, 2011.

* cited by examiner

PERFORMING PAGING IN A WIRELESS PEER-TO-PEER NETWORK

BACKGROUND

I. Field

The following description relates generally to wireless communications, and more particularly to enabling peers to page each other prior to establishing communication in a peer-to-peer network.

II. Background

Wireless communication systems are widely deployed to provide various types of communication; for instance, voice and/or data may be provided via such wireless communication systems. A typical wireless communication system, or network, can provide multiple users access to one or more shared resources. For instance, a system may use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Common wireless communication systems employ one or more base stations that provide a coverage area. A typical base station can transmit multiple data streams for broadcast, multicast and/or unicast services, wherein a data stream may be a stream of data that can be of independent reception interest to a wireless terminal. A wireless terminal within the coverage area of such base station can be employed to receive one, more than one, or all the data streams carried by the composite stream. Likewise, a wireless terminal can transmit data to the base station or another wireless terminal.

Wireless communication systems leverage various portions of wireless spectrum for transferring data. However, wireless spectrum is an expensive and valuable resource. For example, significant costs may be incurred by a company desiring to operate a wireless communication system over a portion of the wireless spectrum (e.g., within the licensed spectrum). Further, conventional techniques typically provide inefficient utilization of wireless spectrum. According to a common illustration, the spectrum allocated for wide area network cellular communication oftentimes is not uniformly utilized across time and space; thus, a significant subset of spectrum may be unused in a given geographic location or in a given time interval.

According to another example, wireless communication systems oftentimes employ peer-to-peer or ad hoc architectures whereby a wireless terminal may transfer signals directly to another wireless terminal. As such, signals need not traverse through a base station; rather, wireless terminals within range of each other may discover and/or communicate directly. However, conventional peer-to-peer networks typically operate in an asynchronous manner whereby peers may effectuate differing tasks at a particular time. Consequently, peers may encounter difficulty associated with identifying and/or communicating with disparate peers within range, power may be inefficiently utilized, and so forth.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating paging within a peer-to-peer communication network. A paging message may be generated at a paging wireless terminal and transferred to a base station. The base station may thereafter route the paging message to a target wireless terminal. For example, the base station may directly send the paging message to the target wireless terminal when the target wireless terminal is within range of the base station. According to another illustration, the base station may provide the paging message to a communication infrastructure network for indirectly routing the paging message to the target wireless terminal (e.g., when the target wireless terminal is out of range of the base station). The paging message may enable direct peer-to-peer communication to be initiated between the paging wireless terminal and the target wireless terminal.

According to related aspects, a method of operating a paging wireless terminal for paging a target wireless terminal via infrastructure node(s) to initiate peer-to-peer communication is described herein. The method may include generating a paging request for initiating direct peer-to-peer communication with a target wireless terminal. Further, the method may comprise transmitting the paging request to a base station for routing the paging request to the target wireless terminal. Moreover, the method may include communicating with the target wireless terminal via a peer-to-peer connection.

Another aspect relates to a wireless communications apparatus. The wireless communications apparatus may include a memory that retains instructions related to generating a paging request for initiating direct peer-to-peer communication with a target wireless terminal, transferring the paging request to a base station for routing the paging request to the target wireless terminal, and communicating with the target wireless terminal via a peer-to-peer connection. Further, the wireless communications apparatus may include a processor, coupled to the memory, configured to execute the instructions retained in the memory.

Yet another aspect relates to a wireless communications apparatus that enables generating and transmitting paging messages for notification of direct peer-to-peer communication. The wireless communications apparatus may include means for generating a paging request for initiating direct peer-to-peer communication with a target wireless terminal. Further, the wireless communications apparatus may include means for transferring the paging request to a base station for routing the paging request to the target wireless terminal. Moreover, the wireless communications apparatus may comprise means for communicating with the target wireless terminal via a peer-to-peer connection.

Still another aspect relates to a machine-readable medium having stored thereon machine-executable instructions for generating a paging request for initiating direct peer-to-peer communication with a target wireless terminal; transmitting the paging request to a base station for routing the paging request to the target wireless terminal; and communicating with the target wireless terminal via a peer-to-peer connection.

In accordance with another aspect, an apparatus in a wireless communication system may include a processor, wherein the processor may be configured to generate a paging request for initiating direct peer-to-peer communication with a target wireless terminal. The processor may also be configured to transfer the paging request to a base station for routing the paging request to the target wireless terminal. Further, the processor may be configured to communicate with the target wireless terminal via a peer-to-peer connection.

According to other aspects, a method of operating a target wireless terminal for being paged by a paging wireless terminal via infrastructure node(s) to establish peer-to-peer communication is described herein. The method may include monitoring transmissions from a base station during a paging interval. Further, the method may comprise determining that a paging message included within the transmissions from the base station in the paging interval is relevant to the target wireless terminal. Moreover, the method may include communicating with the paging wireless terminal via a peer-to-peer connection.

Yet another aspect relates to a wireless communications apparatus that may include a memory that retains instructions related to monitoring transmissions from a base station during a paging interval, determining that a paging message included within the transmissions from the base station in the paging interval is relevant to a target wireless terminal, and communicating with a paging wireless terminal via a peer-to-peer connection. Further, the wireless communications apparatus may comprise a processor, coupled to the memory, configured to execute the instructions retained in the memory.

Another aspect relates to a wireless communications apparatus that enables being paged by a paging wireless terminal via infrastructure node(s). The wireless communications apparatus may include means for monitoring transmissions from a base station during a paging interval; means for determining that a paging message included within the transmissions from the base station in the paging interval is relevant to a target wireless terminal; and means for communicating with the paging wireless terminal via a peer-to-peer connection.

Still another aspect relates to a machine-readable medium having stored thereon machine-executable instructions for monitoring transmissions from a base station during a paging interval, determining that a paging message included within the transmissions from the base station in the paging interval is relevant to a target wireless terminal, and communicating with a paging wireless terminal via a peer-to-peer connection.

In accordance with another aspect, an apparatus in a wireless communication system may include a processor, wherein the processor may be configured to monitor transmissions from a base station during a paging interval. Further, the processor may be configured to determine that a paging message included within the transmissions from the base station in the paging interval is relevant to a target wireless terminal. Moreover, the processor may be configured to communicate with a paging wireless terminal via a peer-to-peer connection.

According to other aspects, a method that facilitates routing paging messages between peers for utilization with direct peer-to-peer communication is described herein. The method may include receiving a paging message from a paging wireless terminal intended for a target wireless terminal, the paging message initiates direct peer-to-peer communication between the paging wireless terminal and the target wireless terminal. Further, the method may comprise determining whether the target wireless terminal is located within an associated coverage area. Moreover, the method may include transmitting the paging message to the target wireless terminal upon determining that the target wireless terminal is within the associated coverage area.

Another aspect relates to a wireless communications apparatus. The wireless communications apparatus may include a memory that retains instructions related to obtaining a paging message from a paging wireless terminal intended for a target wireless terminal, evaluating whether the target wireless terminal is positioned within an associated coverage area, and sending the paging message to the target wireless terminal upon determining that the target wireless terminal is within the associated coverage area. Further, the wireless communications apparatus may comprise a processor, coupled to the memory, configured to execute the instructions retained in the memory.

Yet another aspect relates to a wireless communications apparatus that enables routing paging messages for direct peer-to-peer communication. The wireless communications apparatus may include means for obtaining a paging message from a paging wireless terminal directed to a target wireless terminal; means for determining whether the target wireless terminal is within a corresponding coverage area; and means for routing the paging message to the target wireless terminal according to the determination to enable direct peer-to-peer communication between the paging wireless terminal and the target wireless terminal.

Still another aspect relates to a machine-readable medium having stored thereon machine-executable instructions for receiving a paging message from a paging wireless terminal intended for a target wireless terminal, the paging message initiates direct peer-to-peer communication between the paging wireless terminal and the target wireless terminal. Further, the machine-readable medium may have stored thereon machine-executable instructions for determining whether the target wireless terminal is located within an associated coverage area and transmitting the paging message to the target wireless terminal upon determining that the target wireless terminal is within the associated coverage area.

In accordance with another aspect, an apparatus in a wireless communication system may include a processor, wherein the processor may be configured to receive a paging message from a paging wireless terminal directed to a target wireless terminal; determine whether the target wireless terminal is within a corresponding coverage area; and route the paging message to the target wireless terminal according to the determination to enable direct peer-to-peer communication between the paging wireless terminal and the target wireless terminal.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
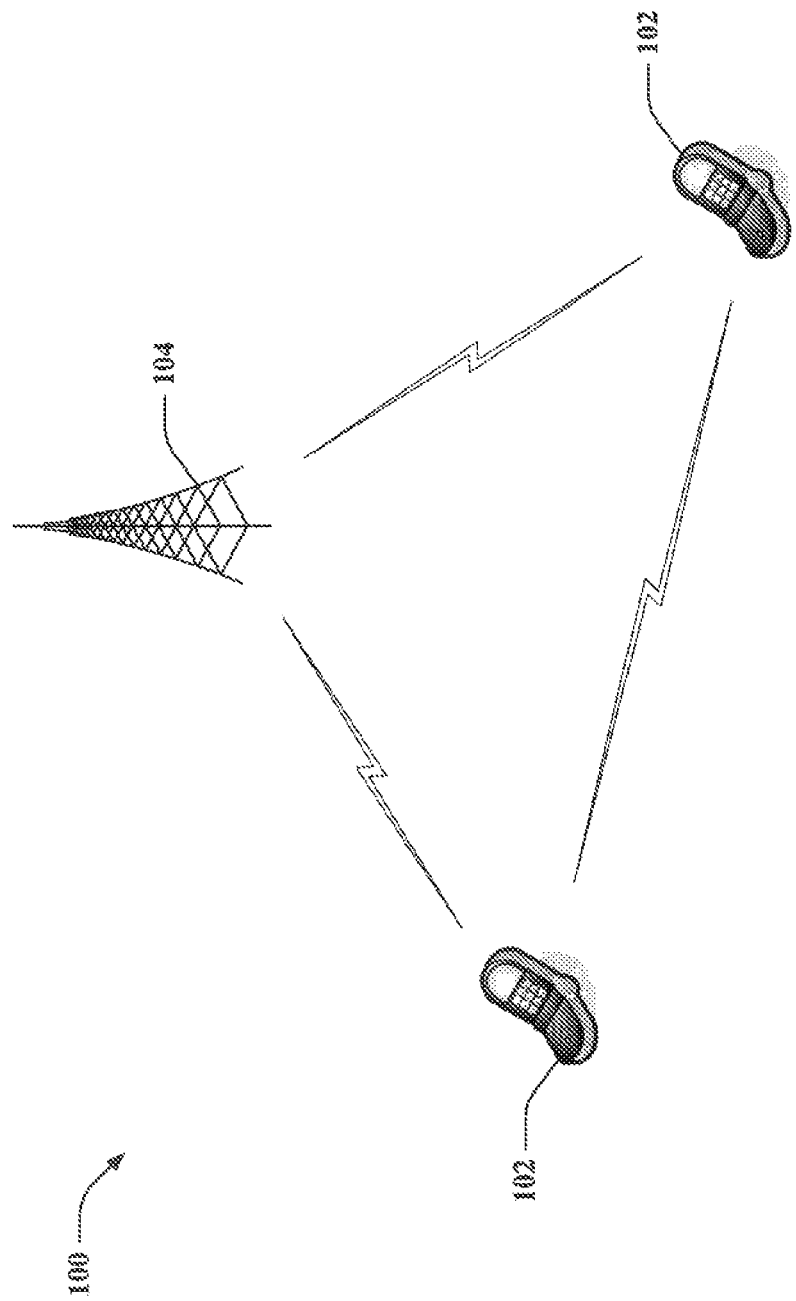
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a wireless terminal. A wireless terminal can also be called a system, subscriber unit, subscriber station, mobile station, mobile, mobile device, remote station, remote terminal, access terminal, user terminal, terminal, wireless communication device, user agent, user device, or user equipment (UE). A wireless terminal may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with wireless terminal(s) and may also be referred to as an access point, Node B, or some other terminology.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 may comprise one or more wireless terminals 102. Although two wireless terminals 102 are depicted, it is to be appreciated that system 100 may include substantially any number of wireless terminals 102. Wireless terminals 102 can be, for example, cellular phones, smart phones, laptops, handheld communication devices, handheld computing devices, satellite radios, global positioning systems, PDAs, and/or any other suitable device for communicating over wireless communication system 100. Wireless terminals 102 can communicate directly with each other via a local area peer-to-peer (P2P) network (e.g., ad hoc network). Peer-to-peer communication may be effectuated by directly transferring signals between wireless terminals 102; thus, the signals need not traverse through a base station (e.g., base station 104). The peer-to-peer network may provide short range, high data rate communication (e.g., within a home, office, etc. type setting).

Further, system 100 may support a wide area network (WAN) (e.g., a cellular WAN system). System 100 may include a base station 104 (e.g., access point) and/or any number of disparate base stations (not shown) in one or more sectors that receive, transmit, repeat, etc. wireless communication signals to each other and/or to one or more wireless terminals 102. Base station 104 can comprise a transmitter chain and a receiver chain, each of which can in turn comprise a plurality of components associated with signal transmission and reception (e.g., processors, modulators, multiplexers, demodulators, demultiplexers, antennas, . . . ) as will be appreciated by one skilled in the art. Wireless terminal(s) 102 may transmit signals to and/or receive signals from base station 104 when communicating via the wide area infrastructure network supported by system 100.

Peer-to-peer communication between wireless terminals 102 may be synchronous. For example, wireless terminals 102 may utilize a common clock reference to synchronize performance of distinct functions. Wireless terminals 102 may obtain timing signals from base station 104 (and/or a transmitter (not shown) that provides less functionality) utilized to synchronize operation of wireless terminals 102. Wireless terminal 102 may obtain timing signals from other sources, such as GPS satellites. According to an illustration, time may be meaningfully partitioned in a peer-to-peer network for functions such as peer discovery, paging, and traffic. Further, it is contemplated that each peer-to-peer network may set its own time.

Wireless terminals 102 may enter into a low-power mode (e.g., sleep state) during periods of time of low traffic activity. While in the low-power mode, wireless terminals 102 need not listen to and/or decode traffic requests; thus, battery life associated with wireless terminals 102 that utilize the low-power mode may be extended. For example, a subset, all, etc. of the traffic requests can be ignored by wireless terminals 102 while in the low-power mode. Before effectuating direct peer-to-peer communication in a peer-to-peer network, wireless terminals 102 (e.g., peers) may page each other (e.g., during a paging interval) with notifications that initiate direct peer-to-peer communication (e.g., direct peer-to-peer communication can occur during a traffic interval). Paging wireless terminals (e.g., one or more of wireless terminals 102) may submit paging requests to the WAN through base stations 104, and the WAN then sends corresponding paging messages to target wireless terminals (e.g., one or more of wireless terminals 102). For example, the paging messages can be transferred through a paging channel of the WAN that is monitored by target wireless terminals. Note that the target wireless terminal may already monitor the paging channel of the WAN for possible paging messages from other WAN users. The paging wireless terminal in effect utilizes the WAN paging mechanism to page the target wireless terminal to set up a direct peer-to-peer connection. The process by which this paging between peers takes place may be referred to as peer paging.

The paging request (from the paging terminal to the WAN or base station 104) and the paging message may be the same, in which case the WAN or base station 104 forwards the paging request to the target wireless terminal using the paging channel of the WAN. Alternatively, the base station 104 or some node in the WAN generates the paging message from the paging request (e.g., to enable conforming the paging message to the paging channel structure). The following description will not differentiate the paging request and the paging message. Instead, the description uses the term "paging message" to represent the paging request and the paging message and the particular meaning (e.g., whether the paging message is the request from the paging wireless terminal to the WAN or the paging message is the message in the paging channel from the WAN to the target wireless terminal) can be determined from the context.

It is possible that the base station that receives the paging request from paging wireless terminal is the same base station that sends the paging message to the target wireless terminal (e.g., when the two wireless terminals are both in the coverage of the base station). Alternative, a first base station can receive the paging request from the paging wireless terminal, and can realize that the target wireless terminal is out of coverage associated with the first base station. For example, the first base station can recognize that the target wireless terminal is not registered with the first base station. Then, the first base station may forward the paging request to a second base station, either directly or through the core WAN network. The second base station then sends a paging message to the target wireless terminal. Upon receiving paging messages with notifications to begin peer-to-peer communication, the target wireless terminal may directly communicate with corresponding paging wireless terminal (e.g., upon arousal from the low-power mode).

Figure 2:
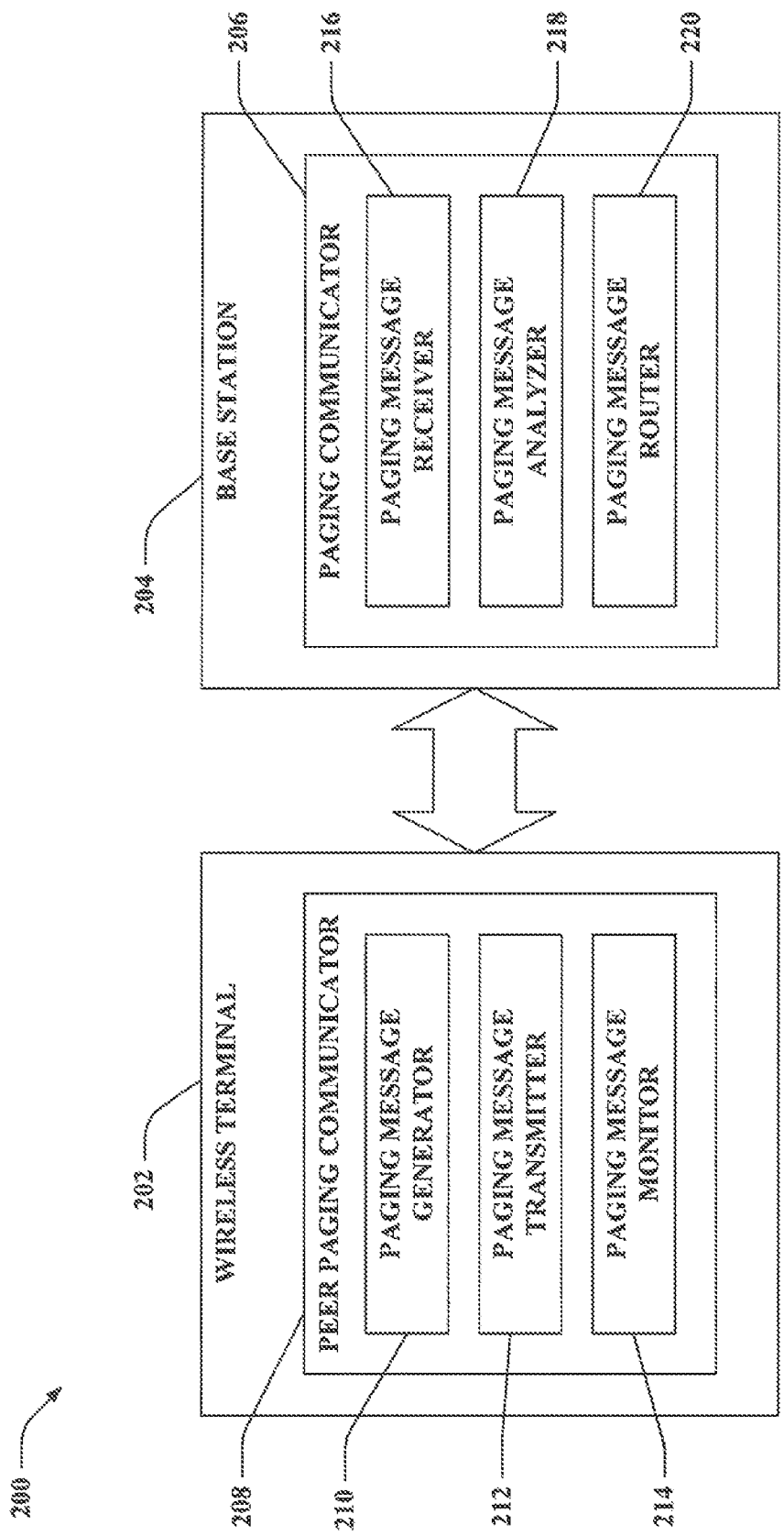
FIG. 2 is an illustration of an example system that enables transferring paging messages for peer-to-peer paging through one or more infrastructure nodes.

Now turning to FIG. 2, illustrated is a system 200 that enables transferring paging messages for peer-to-peer paging through one or more infrastructure nodes. System 200 includes a wireless terminal 202 and a base station 204; however, it is to be appreciated that system 200 can include substantially any number of wireless terminals similar to wireless terminal 202 and/or substantially any number of base stations similar to base station 204. Wireless terminal 202 may be within vicinity of base station 204 (e.g., data may be communicated between wireless terminal 202 and base station 204). In addition, wireless terminal 202 may be connected to an infrastructure network (e.g., wide area network) through base station 204. Although the following provides further detail with regards to wireless terminal 202 and base station 204, it is to be appreciated that such illustrations may similarly apply to one or more wireless terminals interacting with one or more base stations. Further, although much of the following relates to communicating paging messages via base station 204, it is contemplated that substantially any type of infrastructure node (e.g., base station, access point, router, . . . ) can additionally or alternatively be employed for transferring such paging messages.

Wireless terminal 202 may include a peer paging communicator 208 that effectuates sending and/or receiving paging messages to and/or from base station 204 of wireless terminal 202. Peer paging communicator 208 may further comprise a paging message generator 210, a paging message transmitter 212 and a paging message monitor 214. Upon determination that direct peer-to-peer communication with a target wireless terminal (not shown) is desired, paging message generator 210 of wireless terminal 202 may generate a paging message; as such, wireless terminal 202 may be a paging wireless terminal. The paging message may include a request and/or notification for direct peer-to-peer communication between paging wireless terminal 202 and the target wireless terminal. The paging message may also include a network address (e.g., IP address) of the target wireless terminal. For example, information (e.g., cellular identifier, MAC identifier, hashed version of a plain-text name, network address, pertaining to peer(s) within range (e.g., peer(s) that are detected and/or identified, may be obtained by wireless terminal 202 during peer discovery (e.g., each peer may broadcast such information during a peer discovery interval, . . . ), and this information can be utilized by peer paging communicator 208 (e.g., included in the paging message yielded by the paging message generator 210, . . . ) in connection with paging one or more of such peer(s) through base stations or WAN. Additional information such as a connection identifier, an identifier of the paging wireless terminal (e.g., wireless terminal 202, . . . ), etc. may also be included in the paging message yielded by paging message generator 210. Paging message generator 210 may also package the paging message for transmission. For example, paging message generator 210 may format, encrypt, etc. the paging message for transfer to the target wireless terminal via base station 204 (and/or any disparate nodes within the infrastructure network).

Paging message transmitter 212 sends the paging message to base station 204; thereafter, base station 204 can enable routing the paging message to the target wireless terminal. For instance, paging message transmitter 212 may identify that a particular base station (e.g., base station 204) is within range (e.g., positioned within close proximity); thus, paging message transmitter 212 may transmit the paging message to such recognized base station 204. After transmitting the paging message, wireless terminal 202 may prepare for direct peer-to-peer communication with the target wireless terminal during a corresponding traffic interval. Thus, after paging, wireless terminal 202 and the target wireless terminal may directly communicate (e.g., direct peer-to-peer communication such that traffic need not traverse through base station 204 and/or any disparate infrastructure nodes, . . . ). For example, the paging message sent by wireless terminal 202 may inform (e.g., directly, indirectly, . . . ) the target wireless terminal that wireless terminal 202 desires to directly communicate in a peer-to-peer manner.

Moreover, base station 204 includes a paging communicator 206 that enables transferring pages from paging wireless terminal(s) (e.g., wireless terminal 202, disparate wireless terminal (not shown), . . . ) to target wireless terminal(s) (e.g., disparate wireless terminal, wireless terminal 202, . . . ). Paging communicator 206 may comprise a paging message receiver 216, a paging message analyzer 218 and a paging message router 220. Paging message receiver 216 may obtain paging messages from wireless terminal 202 (e.g., yielded by paging message generator 210 and/or transferred by paging message transmitter 212, . . . ). Additionally or alternatively, paging message receiver 216 may obtain paging messages communicated via various infrastructure nodes (e.g., WAN infrastructure).

Paging message analyzer 218 may decode and evaluate paging messages. For example, paging messages may include information pertaining to requests for direct peer-to-peer communication with target wireless terminals to which such paging messages are being transferred. The paging message may also include a network address of the target wireless terminal (e.g., IP address or MAC identifier of the target wireless terminal, . . . ), a connection identifier, an identifier related to the paging wireless terminal 202, and so forth. Paging message analyzer 218 may determine an identity of the target wireless terminal and/or whether the target wireless terminal is within vicinity of base station 204. If the target wireless terminal is not within range of base station 204, paging message router 220 may forward the paging message to an associated communication infrastructure (e.g., network). The communication infrastructure may route the paging message to the target wireless terminal by way of any number of disparate infrastructure nodes. Alternatively, if the target wireless terminal is within vicinity of base station 204, paging message router 220 may transmit the paging message directly to the target wireless terminal (e.g., the paging message need not be communicated to the infrastructure network, . . . ); thus, the paging message need not traverse through disparate infrastructure nodes.

At times when wireless terminal 202 is experiencing low traffic activity, wireless terminal 202 may enter into a low-power mode (e.g., sleep state). While in the low-power mode, paging message monitor 214 may continue to monitor for paging messages sent by base station 204 (e.g., from a paging wireless terminal). Upon detecting a paging message from base station 204, paging message monitor 214 may receive and decode the paging message. Paging message monitor 214 may determine that the paging message includes a request for direct peer-to-peer communication to occur with the paging wireless terminal; thus, the paging message monitor 214 may enable wireless terminal 202 to be aroused from the low-power mode to listen to upcoming traffic requests. Further, paging message monitor 214 may evaluate the paging message to decipher a time for such direct peer-to-peer communication, a manner by which such communication is to be effectuated (e.g., connection ID), and so forth. Wireless terminal 202 may then begin direct peer-to-peer communication with the requesting wireless terminal.

Figure 3:
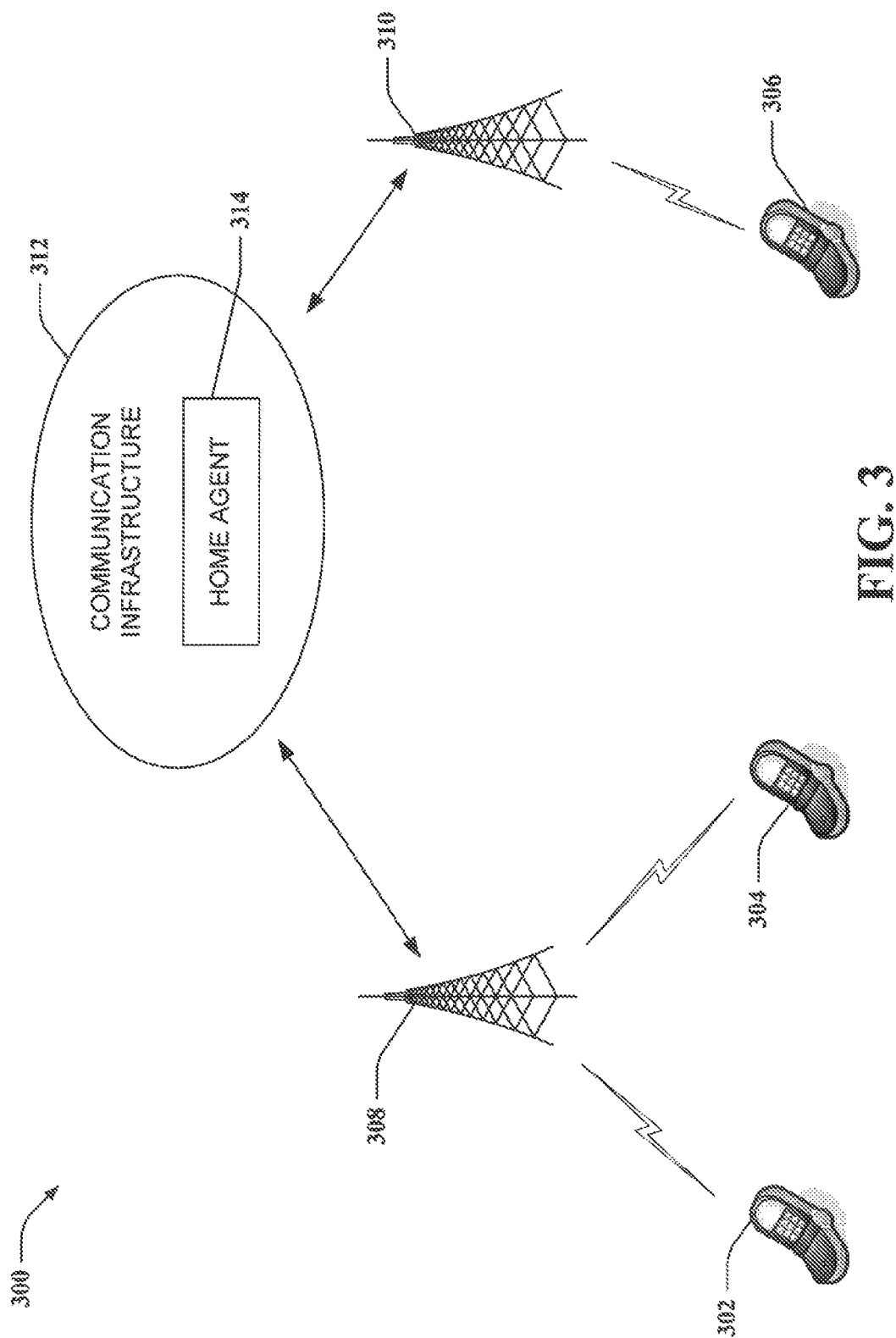
FIG. 3 is an illustration of an example system that transfers paging messages between wireless terminals for initiating direct peer-to-peer communication, where the paging messages can be transferred via an infrastructure-based paging mechanism.

Referring now to FIG. 3, illustrated is a system 300 that transfers paging messages between wireless terminals for initiating direct peer-to-peer communication, where the paging messages can be transferred via an infrastructure-based paging mechanism. System 300 may comprise any number of wireless terminals (e.g., wireless terminals 302, 304, 306, . . . ), any number of base stations (e.g., base stations 308, 310, . . . ) and a communication infrastructure 312 (e.g., infrastructure network, wide area network, . . . ). Wireless terminals 302 and 304 may be within a coverage area of base station 308 and wireless terminal 306 may be within a coverage area of base station 310. Base stations 308-310 may be coupled via communication infrastructure 312. During periods of low traffic activity, wireless terminals 302-306 may enter into a low-power mode (e.g., sleep state) to conserve power. Wireless terminals 302-306 need not listen and decode each peer-to-peer traffic request during the low-power state. Before establishing direct peer-to-peer communication with each other, wireless terminals 302-306 may page each other to rouse each other from the low-power state. Note that each wireless terminal 302-306 may continue to monitor the paging channel of the corresponding base station 308-310 for possible incoming paging messages.

For example, wireless terminal 302 may wish to establish direct peer-to-peer communication with wireless terminal 306. Wireless terminal 302, the paging wireless terminal, may generate a paging message utilized to request direct peer-to-peer communication with wireless terminal 306. The paging message may include a unique identification of wireless terminal 306, the target wireless terminal. The paging message may also include the time at which the two terminals (e.g., wireless terminals 302 and 306) are expected to establish a direct peer-to-peer connection, an identifier pertaining to the source of the paging message (e.g., identifier of paging wireless terminal 302), a connection identifier, etc. Paging wireless terminal 302 may transmit the paging message to base station 308 during a peer paging interval. Upon recognizing that the paging message is intended for wireless terminal 306, which is out of range of base station 308, base station 308 may forward the paging message to communication infrastructure 312. Communication infrastructure 312 may include a home agent 314 that is associated with wireless terminal 306. Home agent 314 may track a location of target wireless terminal 306 (e.g., home agent 314 can identify that wireless terminal 306 is associated with base station 310). Further, home agent 314 may enable routing the paging message via communication infrastructure 312 to base station 310 associated with target wireless terminal 306. It is contemplated that home agent 314 may track one or more wireless terminals 302-306; further, communication infrastructure 312 may include any number of home agents similar to home agent 314. Upon receiving the paging message, base station 310 may transmit the paging message to target wireless terminal 306. Wireless terminal 306 may monitor and receive the paging message from base station 310. Upon receiving the paging message comprising the request for direct peer-to-peer communication, wireless terminal 306 may be aroused from a low-power mode and begin direct peer-to-peer communication with wireless terminal 302. The paging message generated from paging wireless terminal 302 may include parameters, which can be used by the paging and target wireless terminals to establish the direct peer-to-peer connection between the two terminals. For example, parameters may include the connection identifier of the connection and the time from which the connection is supposed to start.

Base stations may also bypass communication infrastructure 312 and transmit paging messages directly to target wireless terminals. For example, if the paging wireless terminal 302 and the target wireless terminal 304 are both within a coverage area of base station 308 as depicted, upon receiving a paging message from paging wireless terminal 302, base station 308 may recognize that target wireless terminal 304 is within vicinity to directly receive communication from base station 308. In such a situation, base station 308 may transmit the paging message directly to the target wireless terminal 304 without forwarding the paging message to communication infrastructure 312 (and/or home agent 314).

Figure 4:
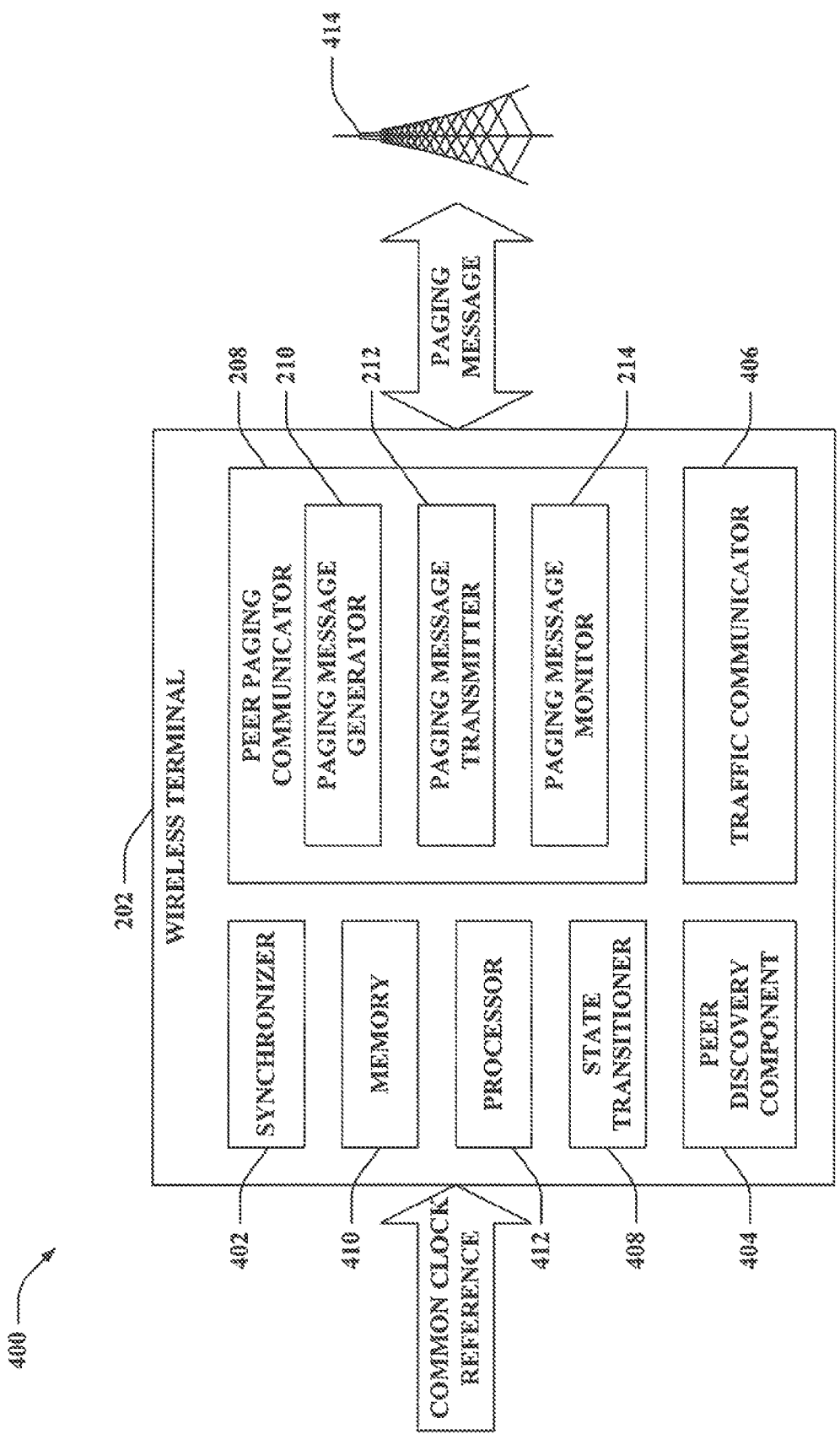
FIG. 4 is an illustration of an example system that effectuates paging over a peer-to-peer network.

Referring to FIG. 4, illustrated is an example system 400 that effectuates paging over a peer-to-peer network. System 400 includes wireless terminal 202 that may communicate with a base station 414 (e.g., wireless terminal 202 may be within a coverage area of base station 414). Wireless terminal 402 may include a synchronizer 402 that coordinates performance of various functions (e.g., peer discovery, paging, traffic). Synchronizer 402 may obtain and analyze a common clock reference to determine a meaningful notion of time. Additionally, disparate wireless terminal(s) may obtain and analyze the common clock reference to yield the same notion of time; hence, peers within a local area may synchronize with the same common clock reference (e.g., from the same base station 414). Therefore, peers get the same timing (timing synchronized) without directly communicating with each other. For example, the common clock reference may be a Beacon signal transmitted by base station 414 within range of wireless terminal 202 and the peers. Further, wireless terminal 202 may comprise peer paging communicator 208, which further includes paging message generator 210, paging message transmitter 212 and paging message monitor 214.

Paging message generator 210 may yield a paging message to be sent by paging message transmitter 212; the paging message may be intended for a target wireless terminal (not shown) and may be employed by such target wireless terminal to effectuate direct peer-to-peer communication (e.g., between wireless terminal 202 and the target wireless terminal). According to an example, paging message generator 210 may provide paging message transmitter 212 with a paging message that may be transmitted to a target wireless terminal (not shown) via base station 414. Upon receiving the paging message from paging wireless terminal 202, base station 414 may analyze the paging message and transmit or forward the paging message to the target wireless terminal (e.g., directly, indirectly, . . . ). By way of illustration, base station 414 may transmit the paging message to the target wireless terminal when the target wireless terminal is within a coverage area of base station 414 (e.g., wireless terminal 202 and target wireless terminal are located within a common cell). Additionally or alternatively, base station 414 may provide the paging message to an infrastructure network for routing to a disparate base station (not shown) in a vicinity of the target wireless terminal (e.g., wireless terminal 202 and target wireless terminal are located in disparate cells).

Paging message monitor 214 may listen for incoming paging messages from base station 414. Once a paging message is detected, paging message monitor 214 may receive and decode the paging message. If a notification for direct peer-to-peer communication is received, paging message monitor 214 may arouse wireless terminal 202 from a low-power mode and activate direct peer-to-peer communication with the sender of the paging message. For example, paging message monitor 214 may employ content (e.g., related to identifier(s), time(s), . . . ) included in the paging message to effectuate such direct peer-to-peer communication.

Wireless terminal 202 may also include a peer discovery component 404 and a traffic communicator 406. Based upon the synchronized notion of time yielded by synchronizer 402, peer discovery component 404 and traffic communicator 406 may transmit and/or receive signals via the peer-to-peer network during respective, allocated times for such functions. Peer discovery component 404 enables wireless terminal 202 to detect and identify disparate peers. Further, during an allotted traffic interval, wireless terminal 202 and peer(s) of wireless terminal 202 may transmit and/or receive traffic by employing traffic communicator 406.

Wireless terminal 202 may additionally include a state transitioner 408. To provide power savings, state transitioner 408 may enable wireless terminal 202 to switch to a low-power mode (e.g., sleep state) during time intervals associated with functions (e.g., peer discovery, traffic) other than direct peer-to-peer communication when wireless terminal 202 is not involved with such functions. Further, state transitioner 408 switches wireless terminal 202 to an active state (e.g., from the low-power mode) during direct peer-to-peer communication to enable wireless terminal 202 to directly communicate with peers. Moreover, state transitioner 408 can enable wireless terminal 202 to listen to a paging time slot while in the sleep state. The periodicity and duration of the paging time slot can be specified by the infrastructure and wireless terminal 202 can know these parameters before joining the peer-to-peer network (e.g., synchronizer 402 may enable determining such parameters).

Moreover, wireless terminal 202 may include memory 410 and a processor 412. Memory 410 may retain an identifier associated with wireless terminal 202. Further, memory 410 may include a list a buddy peers that may be referenced by peer discovery component 404. Additionally, memory 410 may retain instructions related to synchronizing time intervals for differing functions with disparate wireless terminals, establishing a common period of time for peer paging in a local area (e.g., based upon information obtained from a base station 414), identifying location(s) within a peer paging interval for transmitting wireless terminal related signals, generating signals for transmission to disparate wireless terminals, paging disparate wireless terminals for notification of direct peer-to-peer communication, and so forth. Moreover, processor 412 may execute instructions described herein.

Figure 5:
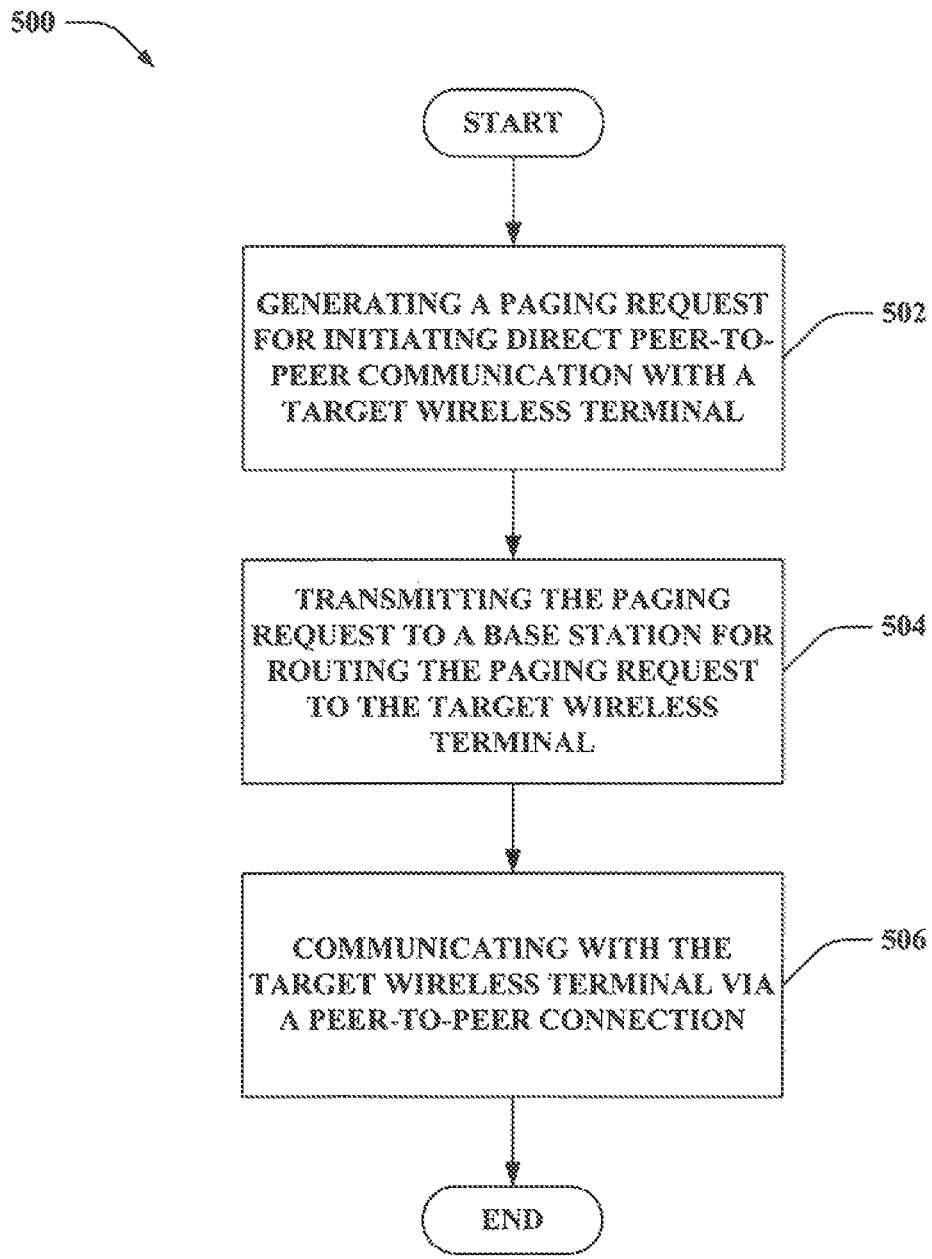
FIG. 5 is an illustration of an example methodology of operating a paging wireless terminal for paging a target wireless terminal via infrastructure node(s) to initiate peer-to-peer communication.
Figure 6:
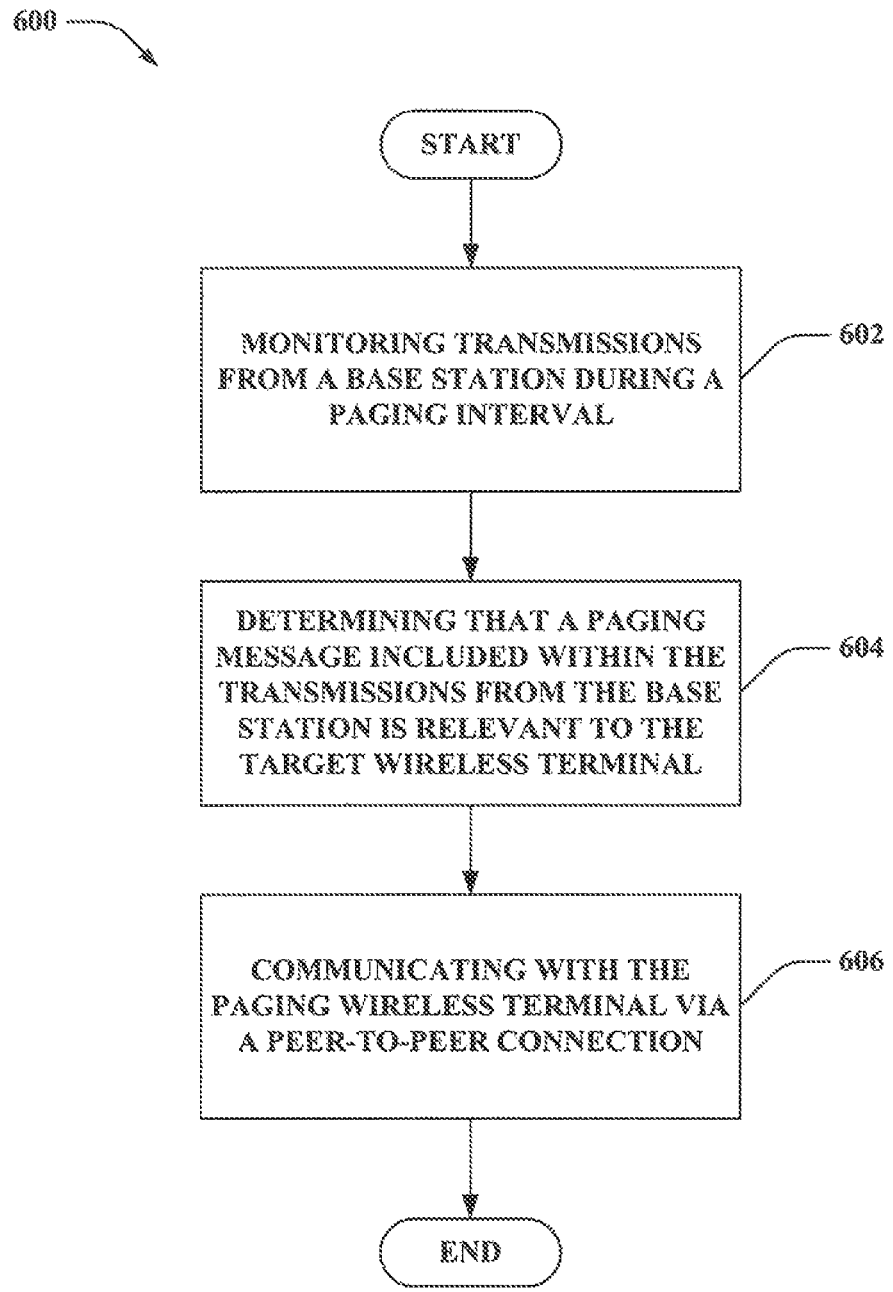
FIG. 6 is an illustration of an example methodology of operating a target wireless terminal for being paged by a paging wireless terminal via infrastructure node(s) to establish peer-to-peer communication.
Figure 7:
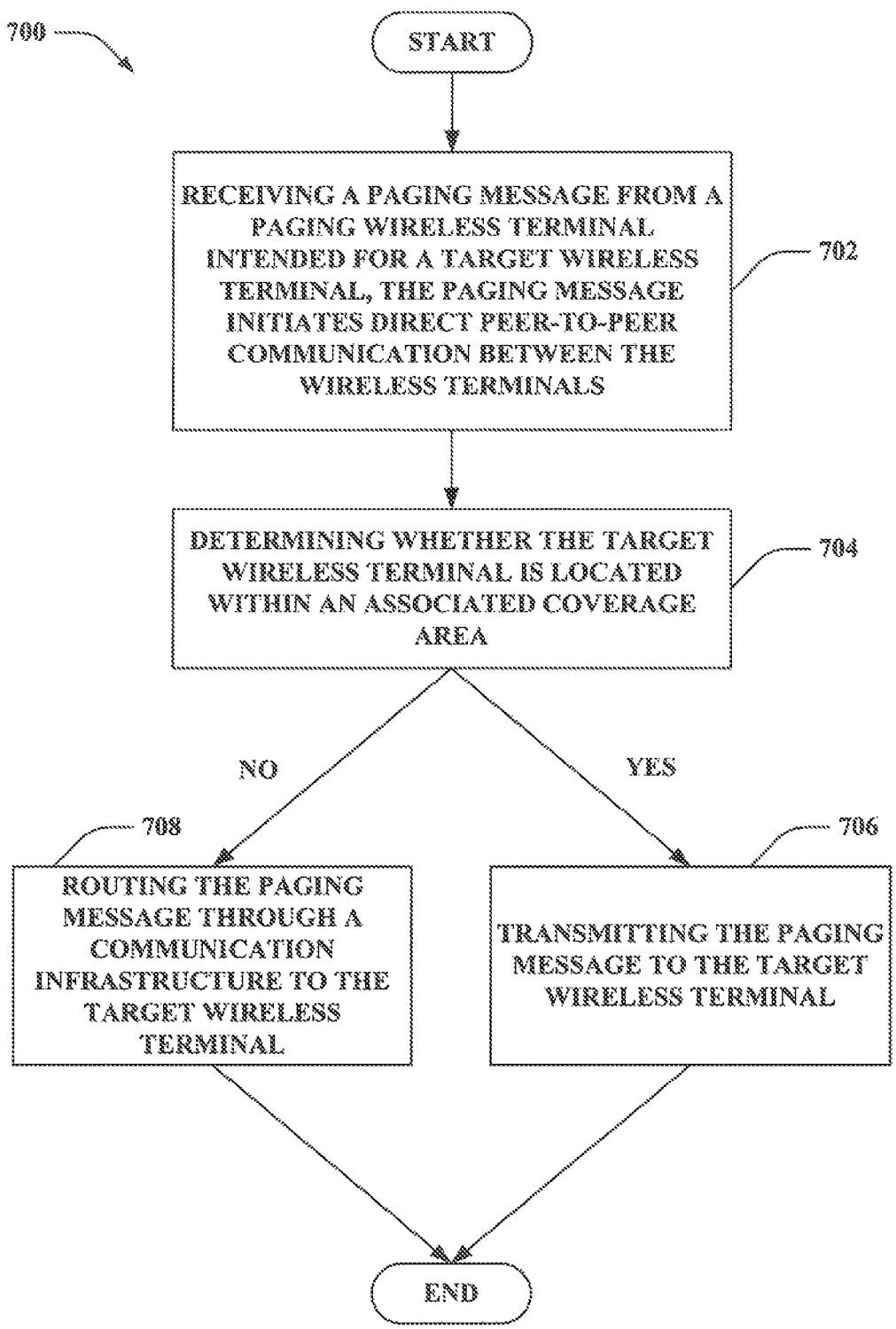
FIG. 7 is an illustration of an example methodology that facilitates routing paging messages between peers for utilization in connection with direct peer-to-peer communication.

Referring to FIGS. 5-7, methodologies relating to performing peer paging within a peer-to-peer network are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Now referring to FIG. 5, illustrated is a methodology 500 of operating a paging wireless terminal for paging a target wireless terminal via infrastructure node(s) to initiate peer-to-peer communication. At 502, a paging request for initiating direct peer-to-peer communication with a target wireless terminal may be generated. The target wireless terminal may be selected for communicating traffic (e.g., during a traffic interval) in a peer-to-peer manner. Moreover, for example, the paging request may include parameters related to the paging and the target wireless terminals (e.g., a direct communication identifier or network address) and/or parameters to be used to establish the direct peer-to-peer connection between the two terminals (e.g., a direct communication connection identifier, a starting time for direct communication connection, . . . ). By way of another illustration, at least a portion of the information incorporated in the generated paging request may be obtained during peer discovery (e.g., the direct communication identifier of the target wireless terminal may be discerned during peer discovery). At 504, the paging request may be transmitted to a base station for routing the paging request to the target wireless terminal. For instance, the paging request may be transferred during a paging interval in which the target wireless terminal monitors the paging channel from the base station, and the paging interval may occur periodically at synchronized times and with durations specified by a communication infrastructure. Moreover, the source (e.g., paging wireless terminal) that transmits the paging request may be positioned within a coverage area of the base station to which the paging request is transferred. The base station may directly, indirectly (e.g., via any number of infrastructure nodes), etc. transfer the paging request to the target wireless terminal. At 506, communication with the target wireless terminal may occur via a peer-to-peer connection. By way of illustration, direct communication may be effectuated based upon parameters included in the paging request. For example, direct communication may be effectuated at the time specified by the paging request. The time may be specified in reference to the common clock source (e.g., as described above in FIG. 4). Moreover, the direct communication connection may be effectuated with the connection identifier based on the parameters included in the paging request.

With reference to FIG. 6, illustrated is a methodology 600 of operating a target wireless terminal for being paged by a paging wireless terminal via infrastructure node(s) to establish peer-to-peer communication. At 602, transmissions from a base station may be monitored during a paging interval. For example, the paging interval may be synchronized (e.g., based upon a common clock reference derived from the WAN) in the WAN network so that a wireless terminal knows when to check the paging channel and a base station knows when to send the paging channel to the wireless terminal if the base station intends to page the wireless terminal. Moreover, the peer (e.g., target wireless terminal, paged wireless terminal, . . . ) that effectuates monitoring may transition between a sleep state and an active state; for instance, the peer may be in the sleep state during periods of time when traffic intended for the peer is lacking, and thus, power associated with the peer may be conserved. Additionally, while in the sleep state, the peer may monitor the transmissions from the base station occurring within the paging interval; meanwhile, at least a subset of the transmissions from the base station at disparate times may be ignored (e.g., need not be monitored, decoded, . . . ). At 604, a paging message included in the transmissions from the base station may be determined to be relevant to the target wireless terminal. The paging message may be directed to the peer that performs the monitoring. For example, the relevance may be determined by evaluating content included with the paging message (e.g., direct communication identifier of a target wireless terminal). Moreover, upon detecting the relevant paging message, the peer may switch to an active state. At 606, communication (e.g., direct communication) may be effectuated with the paging wireless terminal via a peer-to-peer connection. According to an illustration, direct communication can be effectuated based upon content of the paging message. For example, the paging message may provide content that enables identifying the paging wireless terminal, determining a time for starting the direct communication connection, recognizing a connection to be employed for direct communication, selecting an identifier for the direct communication connection, and the like.

Turning to FIG. 7, illustrated is a methodology 700 that facilitates routing paging messages between peers for utilization in connection with direct peer-to-peer communication. At 702, a paging message may be received from a paging wireless terminal intended for a target wireless terminal. The paging message may be employed to initiate direct peer-to-peer communication between the paging wireless terminal and the target wireless terminal. For example, the paging message may be obtained at a base station; however, it is contemplated that any infrastructure node (e.g., access point, router, . . . ) may receive the paging message. Moreover, the paging message may be evaluated to decipher the identity of the target wireless terminal (e.g., an identifier related to the target wireless terminal incorporated in the paging message may be analyzed). Additionally, the paging interval to transmit the paging message can be determined as a function of the identity of the target wireless terminal. At 704, a determination may be effectuated concerning whether the target wireless terminal is located within an associated coverage area. For example, the coverage area may be related to a base station obtaining the paging message. If the target wireless terminal is located within the coverage area, the methodology 700 continues to 706. At 706, the paging message may be transmitted to the target wireless terminal. Thus, the paging message may be transferred directly from the base station obtaining the paging message from the paging wireless terminal to the target wireless terminal; accordingly, a communication infrastructure (e.g., network) may be bypassed. If the target wireless terminal is determined to be located outside of the coverage area at 704, the methodology 700 continues to 708. At 708, the paging message may be routed through a communication infrastructure to the target wireless terminal. It is contemplated that the paging message may be passed through substantially any number of infrastructure nodes while being forwarded to the target wireless terminal. Moreover, the communication infrastructure may be associated with a home agent corresponding to the target wireless terminal, and the home agent may enable locating the target wireless terminal and/or providing the paging message to the target wireless terminal.

It will be appreciated that, in accordance with one or more aspects described herein, inferences can be made regarding peer paging in a peer-to-peer environment. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to identifying and/or locating target wireless terminal when routing a paging message for utilization in connection with communicating via the peer-to-peer network. In accordance with another example, an inference may be made related to determining whether a paging message pertains to a particular peer. It will be appreciated that the foregoing examples are illustrative in nature and are not intended to limit the number of inferences that can be made or the manner in which such inferences are made in conjunction with the various embodiments and/or methods described herein.

Figure 8:
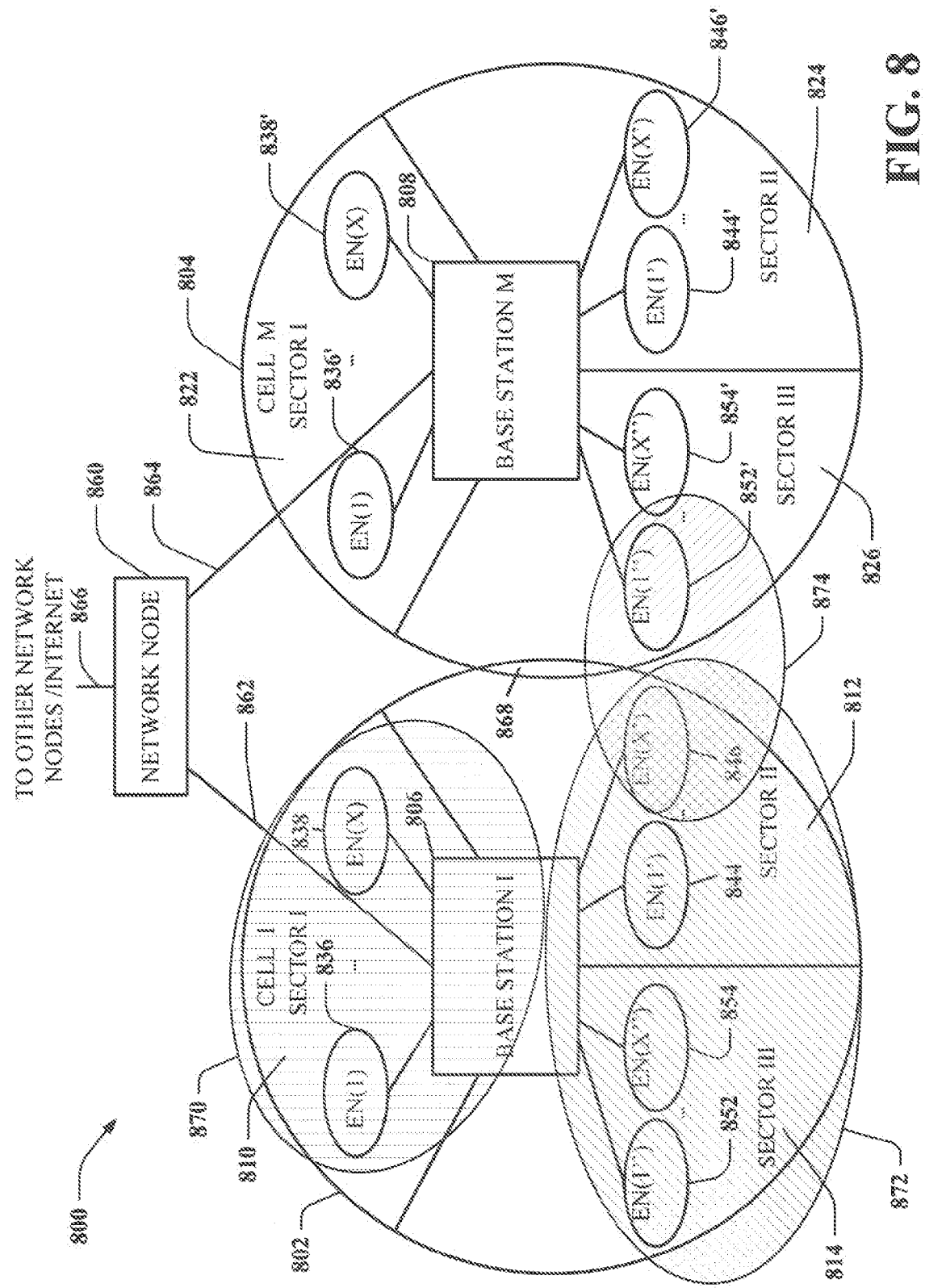
FIG. 8 is an illustration of an example communication system implemented in accordance with various aspects including multiple cells.

FIG. 8 depicts an example communication system 800 implemented in accordance with various aspects including multiple cells: cell I 802, cell M 804. Note that neighboring cells 802, 804 overlap slightly, as indicated by cell boundary region 868. Each cell 802, 804 of system 800 includes three sectors. Cells which have not been subdivided into multiple sectors (N=1), cells with two sectors (N=2) and cells with more than 3 sectors (N>3) are also possible in accordance with various aspects. Cell 802 includes a first sector, sector I 810, a second sector, sector II 812, and a third sector, sector III 814. Each sector 810, 812, 814 has two sector boundary regions; each boundary region is shared between two adjacent sectors.

Cell I 802 includes a base station (BS), base station I 806, and a plurality of end nodes (ENs) (e.g., wireless terminals) in each sector 810, 812, 814. Sector I 810 includes EN(1) 836 and EN(X) 838; sector II 812 includes EN(1') 844 and EN(X') 846; sector III 814 includes EN(1") 852 and EN(X") 854. Similarly, cell M 804 includes base station M 808, and a plurality of end nodes (ENs) in each sector 822, 824, 826. Sector I 822 includes EN(1) 836' and EN(X) 838'; sector II 824 includes EN(1') 844' and EN(X') 846'; sector 3 826 includes EN(1") 852' and EN(X") 854'.

System 800 also includes a network node 860 which is coupled to BS I 806 and BS M 808 via network links 862, 864, respectively. Network node 860 is also coupled to other network nodes, e.g., other base stations, AAA server nodes, intermediate nodes, routers, etc. and the Internet via network link 866. Network links 862, 864, 866 may be, e.g., fiber optic cables. Each end node, e.g., EN(1) 836 may be a wireless terminal including a transmitter as well as a receiver. The wireless terminals, e.g., EN(1) 836 may move through system 800 and may communicate via wireless links with the base station in the cell in which the EN is currently located. The wireless terminals, (WTs), e.g., EN(1) 836, may communicate with peer nodes, e.g., other WTs in system 800 or outside system 800 via a base station, e.g., BS 806, and/or network node 860. WTs, e.g., EN(1) 836 may be mobile communications devices such as cell phones, personal data assistants with wireless modems, etc.

Local area peer-to-peer communication may also be supported by communication system 800. For example, a common spectrum may be utilized for both local area peer-to-peer communication as well as communication via the wide area network (e.g., cellular infrastructure network). Wireless terminals may communicate with other peers via a local area peer-to-peer network such as peer-to-peer networks 870, 872, and 874. Although three peer-to-peer networks 870-874 are depicted, it is to be appreciated that any number, size, shape, etc. of peer-to-peer networks may be supported. For instance, each peer-to-peer network 870-874 may support transfer of signals directly between wireless terminals. Further, each peer-to-peer network 870-874 may include wireless terminals within a similar geographic area (e.g., within range of one another). For example, EN(1) 836 may communicate with EN(X) 838 by way of the local area peer-to-peer network 870. However, it is to be appreciated that wireless terminals need not be associated with the same sector and/or cell to be included in a common peer-to-peer network. Further, peer-to-peer networks may overlap (e.g., EN(X') 846 may leverage peer-to-peer networks 872 and 874). Additionally, some wireless terminals may not be supported by a peer-to-peer network. Wireless terminals may employ the wide area network and/or the peer-to-peer network where such networks overlap (e.g., concurrently or serially). Moreover, wireless terminals may seamlessly switch or concurrently leverage such networks. Accordingly, wireless terminals whether transmitting and/or receiving may selectively employ one or more of the networks to optimize communications.

Figure 9:
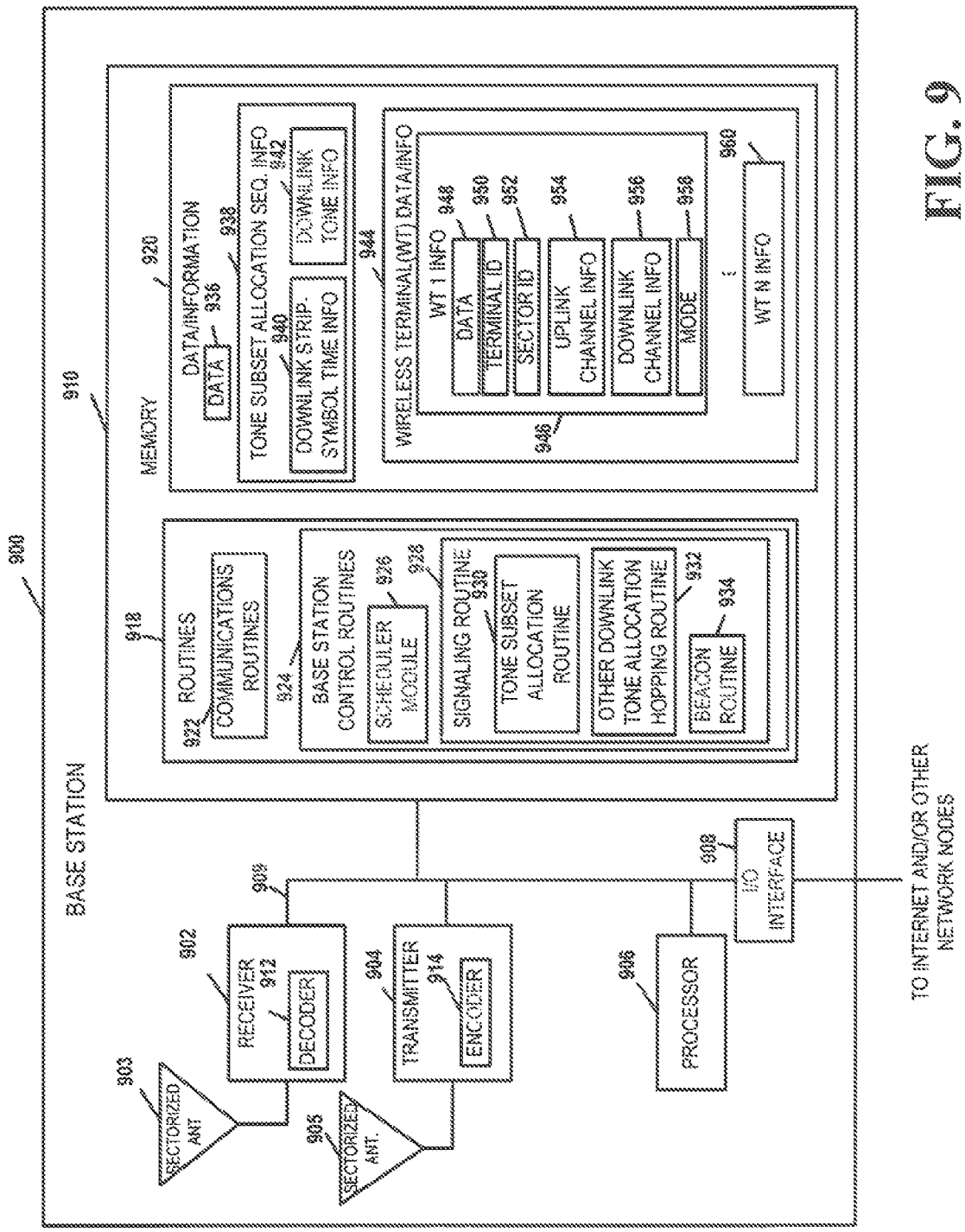
FIG. 9 is an illustration of an example base station in accordance with various aspects.

FIG. 9 illustrates an example base station 900 in accordance with various aspects. Base station 900 implements tone subset allocation sequences, with different tone subset allocation sequences generated for respective different sector types of the cell. Base station 900 may be used as any one of base stations 806, 808 of the system 800 of FIG. 8. The base station 900 includes a receiver 902, a transmitter 904, a processor 906, e.g., CPU, an input/output interface 908 and memory 910 coupled together by a bus 909 over which various elements 902, 904, 906, 908, and 910 may interchange data and information.

Sectorized antenna 903 coupled to receiver 902 is used for receiving data and other signals, e.g., channel reports, from wireless terminals transmissions from each sector within the base station's cell. Sectorized antenna 905 coupled to transmitter 904 is used for transmitting data and other signals, e.g., control signals, pilot signal, beacon signals, etc. to wireless terminals 1000 (see FIG. 10) within each sector of the base station's cell. In various aspects, base station 900 may employ multiple receivers 902 and multiple transmitters 904, e.g., an individual receiver 902 for each sector and an individual transmitter 904 for each sector. Processor 906, may be, e.g., a general purpose central processing unit (CPU). Processor 906 controls operation of base station 900 under direction of one or more routines 918 stored in memory 910 and implements the methods. I/O interface 908 provides a connection to other network nodes, coupling the BS 900 to other base stations, access routers, AAA server nodes, etc., other networks, and the Internet. Memory 910 includes routines 918 and data/information 1120.

Data/information 920 includes data 936, tone subset allocation sequence information 1138 including downlink strip-symbol time information 940 and downlink tone information 942, and wireless terminal (WT) data/info 944 including a plurality of sets of WT information: WT 1 info 946 and WT N info 960. Each set of WT info, e.g., WT 1 info 946 includes data 948, terminal ID 950, sector ID 952, uplink channel information 954, downlink channel information 956, and mode information 958.

Routines 918 include communications routines 922 and base station control routines 924. Base station control routines 924 includes a scheduler module 926 and signaling routines 928 including a tone subset allocation routine 930 for strip-symbol periods, other downlink tone allocation hopping routine 932 for the rest of symbol periods, e.g., non strip-symbol periods, and a beacon routine 934.

Data 936 includes data to be transmitted that will be sent to encoder 914 of transmitter 904 for encoding prior to transmission to WTs, and received data from WTs that has been processed through decoder 912 of receiver 902 following reception. Downlink strip-symbol time information 940 includes the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone information 942 includes information including a carrier frequency assigned to the base station 900, the number and frequency of tones, and the set of tone subsets to be allocated to the strip-symbol periods, and other cell and sector specific values such as slope, slope index and sector type.

Data 948 may include data that WT1 1000 has received from a peer node, data that WT 1 1000 desires to be transmitted to a peer node, and downlink channel quality report feedback information. Terminal ID 950 is a base station 900 assigned ID that identifies WT 1 1000. Sector ID 952 includes information identifying the sector in which WT1 1000 is operating. Sector ID 952 can be used, for example, to determine the sector type. Uplink channel information 954 includes information identifying channel segments that have been allocated by scheduler 926 for WT1 1000 to use, e.g., uplink traffic channel segments for data, dedicated uplink control channels for requests, power control, timing control, etc. Each uplink channel assigned to WT1 1000 includes one or more logical tones, each logical tone following an uplink hopping sequence. Downlink channel information 956 includes information identifying channel segments that have been allocated by scheduler 926 to carry data and/or information to WT1 1000, e.g., downlink traffic channel segments for user data. Each downlink channel assigned to WT1 1000 includes one or more logical tones, each following a downlink hopping sequence. Mode information 958 includes information identifying the state of operation of WT1 1000, e.g. sleep, hold, on.

Communications routines 922 control the base station 900 to perform various communications operations and implement various communications protocols. Base station control routines 924 are used to control the base station 900 to perform basic base station functional tasks, e.g., signal generation and reception, scheduling, and to implement the steps of the method of some aspects including transmitting signals to wireless terminals using the tone subset allocation sequences during the strip-symbol periods.

Signaling routine 928 controls the operation of receiver 902 with its decoder 912 and transmitter 904 with its encoder 914. The signaling routine 928 is responsible for controlling the generation of transmitted data 936 and control information. Tone subset allocation routine 930 constructs the tone subset to be used in a strip-symbol period using the method of the aspect and using data/information 920 including downlink strip-symbol time info 940 and sector ID 952. The downlink tone subset allocation sequences will be different for each sector type in a cell and different for adjacent cells. The WTs 1000 receive the signals in the strip-symbol periods in accordance with the downlink tone subset allocation sequences; the base station 900 uses the same downlink tone subset allocation sequences in order to generate the transmitted signals. Other downlink tone allocation hopping routine 932 constructs downlink tone hopping sequences, using information including downlink tone information 942, and downlink channel information 956, for the symbol periods other than the strip-symbol periods. The downlink data tone hopping sequences are synchronized across the sectors of a cell. Beacon routine 934 controls the transmission of a beacon signal, e.g., a signal of relatively high power signal concentrated on one or a few tones, which may be used for synchronization purposes, e.g., to synchronize the frame timing structure of the downlink signal and therefore the tone subset allocation sequence with respect to an ultra-slot boundary.

Figure 10:
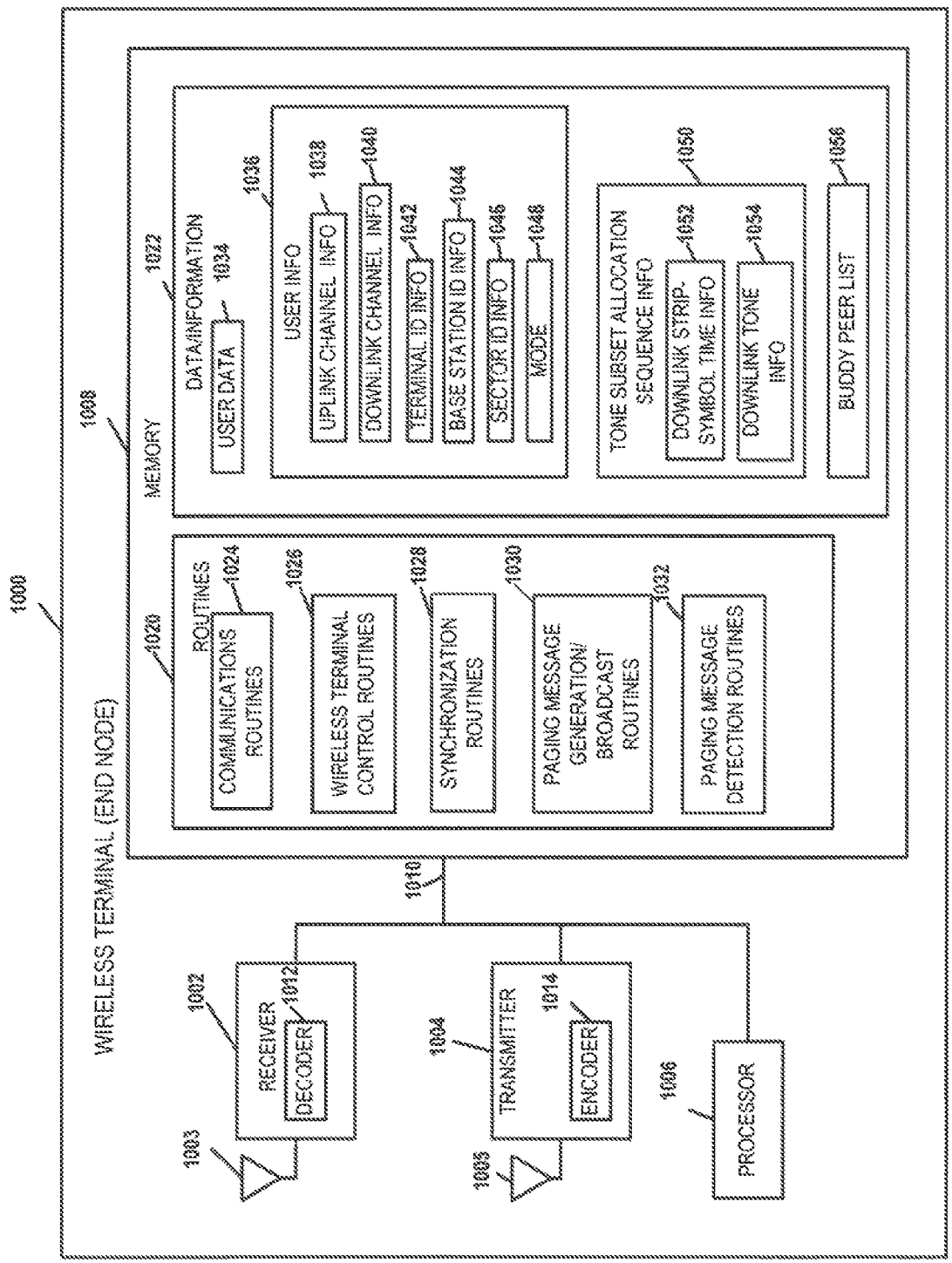
FIG. 10 is an illustration of an example wireless terminal (e.g., mobile device, end node, . . . ) implemented in accordance with various aspects described herein.

FIG. 10 illustrates an example wireless terminal (e.g., end node, mobile device, . . . ) 1000 which can be used as any one of the wireless terminals (e.g., end nodes, mobile devices, . . . ), e.g., EN(1) 836, of the system 800 shown in FIG. 8. Wireless terminal 1000 implements the tone subset allocation sequences. Wireless terminal 1000 includes a receiver 1002 including a decoder 1012, a transmitter 1004 including an encoder 1014, a processor 1006, and memory 1008 which are coupled together by a bus 1010 over which the various elements 1002, 1004, 1006, 1008 can interchange data and information. An antenna 1003 used for receiving signals from a base station 900 (and/or a disparate wireless terminal) is coupled to receiver 1002. An antenna 1005 used for transmitting signals, e.g., to base station 900 (and/or a disparate wireless terminal) is coupled to transmitter 1004.

The processor 1006 (e.g., a CPU) controls operation of wireless terminal 1000 and implements methods by executing routines 1020 and using data/information 1022 in memory 1008.

Data/information 1022 includes user data 1034, user information 1036, tone subset allocation sequence information 1050, and a buddy peer list 1056. User data 1034 may include data, intended for a peer node, which will be routed to encoder 1014 for encoding prior to transmission by transmitter 1004 to base station 900, and data received from the base station 900 which has been processed by the decoder 1012 in receiver 1002. User information 1036 includes uplink channel information 1038, downlink channel information 1040, terminal ID information 1042, base station ID information 1044, sector ID information 1046, and mode information 1048. Uplink channel information 1038 includes information identifying uplink channels segments that have been assigned by base station 900 for wireless terminal 1000 to use when transmitting to the base station 900. Uplink channels may include uplink traffic channels, dedicated uplink control channels, e.g., request channels, power control channels and timing control channels. Each uplink channel includes one or more logic tones, each logical tone following an uplink tone hopping sequence. The uplink hopping sequences are different between each sector type of a cell and between adjacent cells. Downlink channel information 1040 includes information identifying downlink channel segments that have been assigned by base station 900 to WT 1000 for use when BS 900 is transmitting data/information to WT 1000. Downlink channels may include downlink traffic channels and assignment channels, each downlink channel including one or more logical tone, each logical tone following a downlink hopping sequence, which is synchronized between each sector of the cell.

User info 1036 also includes terminal ID information 1042, which is a base station 900 assigned identification, base station ID information 1044 which identifies the specific base station 900 that WT has established communications with, and sector ID info 1046 which identifies the specific sector of the cell where WT 900 is presently located. Base station ID 1044 provides a cell slope value and sector ID info 1046 provides a sector index type; the cell slope value and sector index type may be used to derive tone hopping sequences. Mode information 1048 also included in user info 1036 identifies whether the WT 1000 is in sleep mode, hold mode, or on mode.

Tone subset allocation sequence information 1050 includes downlink strip-symbol time information 1052 and downlink tone information 1054. Downlink strip-symbol time information 1052 include the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone info 1054 includes information including a carrier frequency assigned to the base station 900, the number and frequency of tones, and the set of tone subsets to be allocated to the strip-symbol periods, and other cell and sector specific values such as slope, slope index and sector type.

Routines 1020 include communications routines 1024, wireless terminal control routines 1026, synchronization routines 1028, paging message generation/broadcast routines 1030, and paging message detection routines 1032. Communications routines 1024 control the various communications protocols used by WT 1000. For example, communications routines 1024 may enable communicating via a wide area network (e.g., with base station 900) and/or a local area peer-to-peer network (e.g., directly with disparate wireless terminal(s)). By way of further example, communications routines 1024 may enable receiving a broadcast signal (e.g., from base station 900). Wireless terminal control routines 1026 control basic wireless terminal 1000 functionality including the control of the receiver 1002 and transmitter 1004. Synchronization routines 1028 control synchronizing wireless terminal 1000 to a received signal (e.g., from base station 900). Peers within a peer-to-peer network may also be synchronized to the signal. For example, the received signal may be a Beacon, a PN (pseudo random) sequence signal, a pilot signal, etc. Further, the signal may be periodically obtained and a protocol (e.g., associated with synchronization routines 1028) also known to peers may be utilized to identify intervals corresponding to distinct functions (e.g., peer discovery, paging, traffic). Paging message generation/broadcast routines 1030 control creating a message for transmission during an identified peer paging interval. A symbol and/or tone associated with the message may be selected based upon a protocol (e.g., associated with paging message generation/broadcast routines 1030). Moreover, paging message generation/broadcast routines 1030 may control sending the message to peers within the peer-to-peer network. Paging message detection routines 1032 control detection and identification of peers based upon messages received during an identified peer paging interval. Further, paging message detection routines 1032 may identify peers based at least in part upon information retained in buddy peer list 1056.

Figure 11:
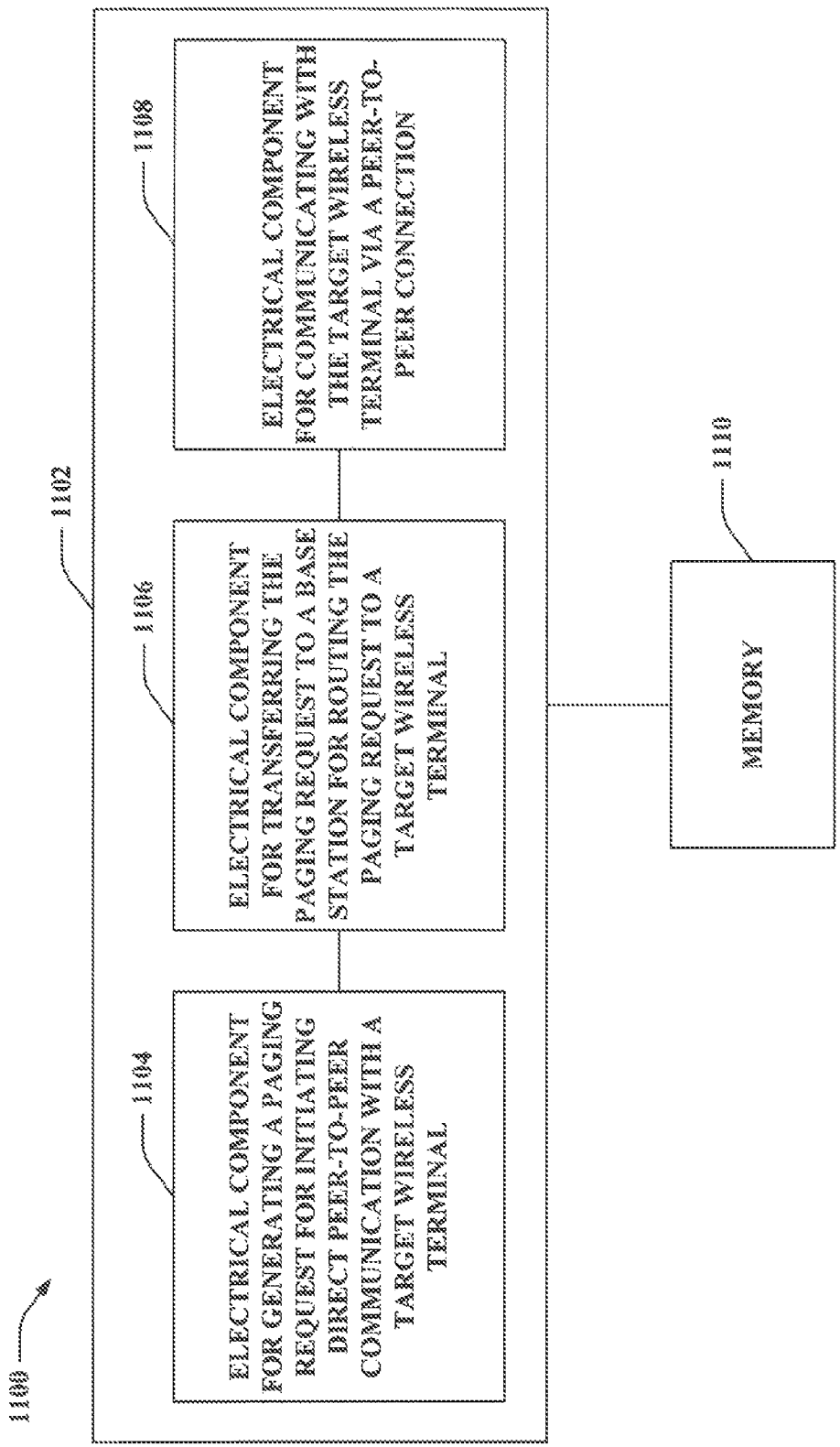
FIG. 11 is an illustration of an example system that enables generating and transmitting paging messages for notification of direct peer-to-peer communication.

With reference to FIG. 11, illustrated is a system 1100 that enables generating and transmitting paging messages for notification of direct peer-to-peer communication. For example, system 1100 may reside at least partially within a wireless terminal. It is to be appreciated that system 1100 is represented as including functional blocks, which may be functional blocks that represent functions implemented by a processor, software, or combination thereof (e.g., firmware). System 1100 includes a logical grouping 1102 of electrical components that can act in conjunction. For instance, logical grouping 1102 may include an electrical component for generating a paging request for initiating direct peer-to-peer communication with a target wireless terminal 1104. Pursuant to an illustration, the paging request may include data pertaining to the cellular identification of a target wireless terminal, a time for direct peer-to-peer communication, identification of a connection to be employed for direct peer-to-peer communication, and so forth. Further, logical grouping 1102 may comprise an electrical component for transferring the paging request to a base station for routing the paging request to a target wireless terminal 1106. The logical grouping 1102 can also include an electrical component for communicating (e.g., directly) with the target wireless terminal via a peer-to-peer connection 1108. Additionally, system 1100 may include a memory 1110 that retains instructions for executing functions associated with electrical components 1104, 1106 and 1108. While shown as being external to memory 1110, it is to be understood that one or more of electrical components 1104, 1106 and 1108 may exist within memory 1110.

Figure 12:
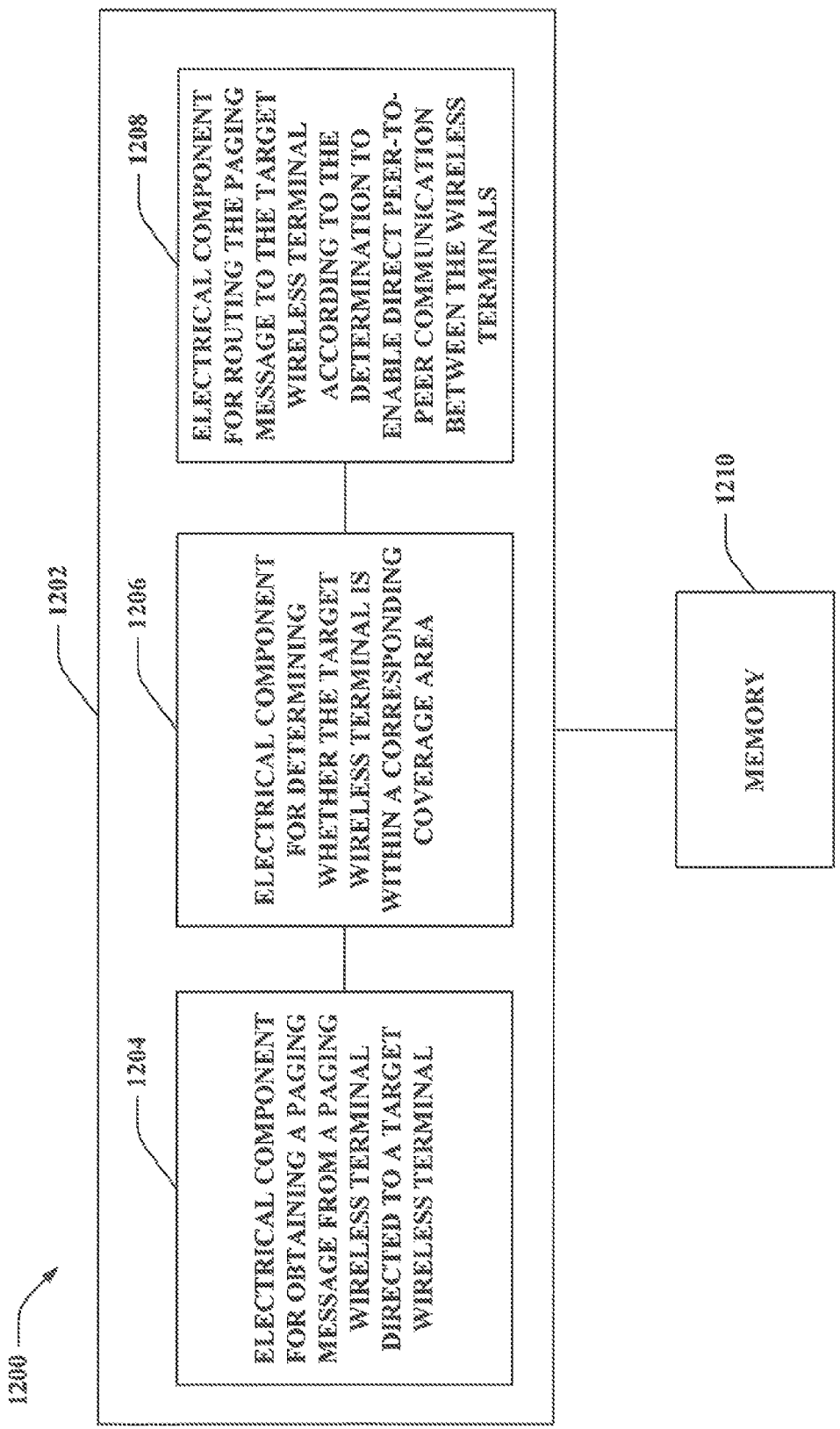
FIG. 12 is an illustration of an example system that enables routing paging messages for direct peer-to-peer communication.

Referring now to FIG. 12, illustrated is an example system 1200 that enables routing paging messages for direct peer-to-peer communication. For example, system 1200 may reside at least partially within a base station. It is to be appreciated that system 1200 is represented as including functional blocks, which may be functional blocks that represent functions implemented by a processor, software, or combination thereof (e.g., firmware). System 1200 includes a logical grouping 1202 of electrical components that can act in conjunction. For instance, logical grouping 1202 may include an electrical component for obtaining a paging message from a paging wireless terminal directed to a target wireless terminal 1204. Further, the logical grouping 1202 may comprise an electrical component for determining whether the target wireless terminal is within a corresponding coverage area 1206. The logical grouping 1202 can also include an electrical component for routing the paging message to the target wireless terminal according to the determination to enable direct peer-to-peer communication between the wireless terminals 1208. For instance, upon determining that the target wireless terminal is within vicinity (e.g., of the base station), the paging message may be sent directly to the target wireless terminal. According to another illustration, upon determining that the target wireless terminal is outside of the coverage area, the paging message may be indirectly routed to the target wireless terminal via a communication infrastructure. Additionally, system 1200 may include a memory 1210 that retains instructions for executing functions associated with electrical components 1204, 1206 and 1208. While shown as being external to memory 1210, it is to be understood that one or more of electrical components 1204, 1206 and 1208 may exist within memory 1210.

Figure 13:
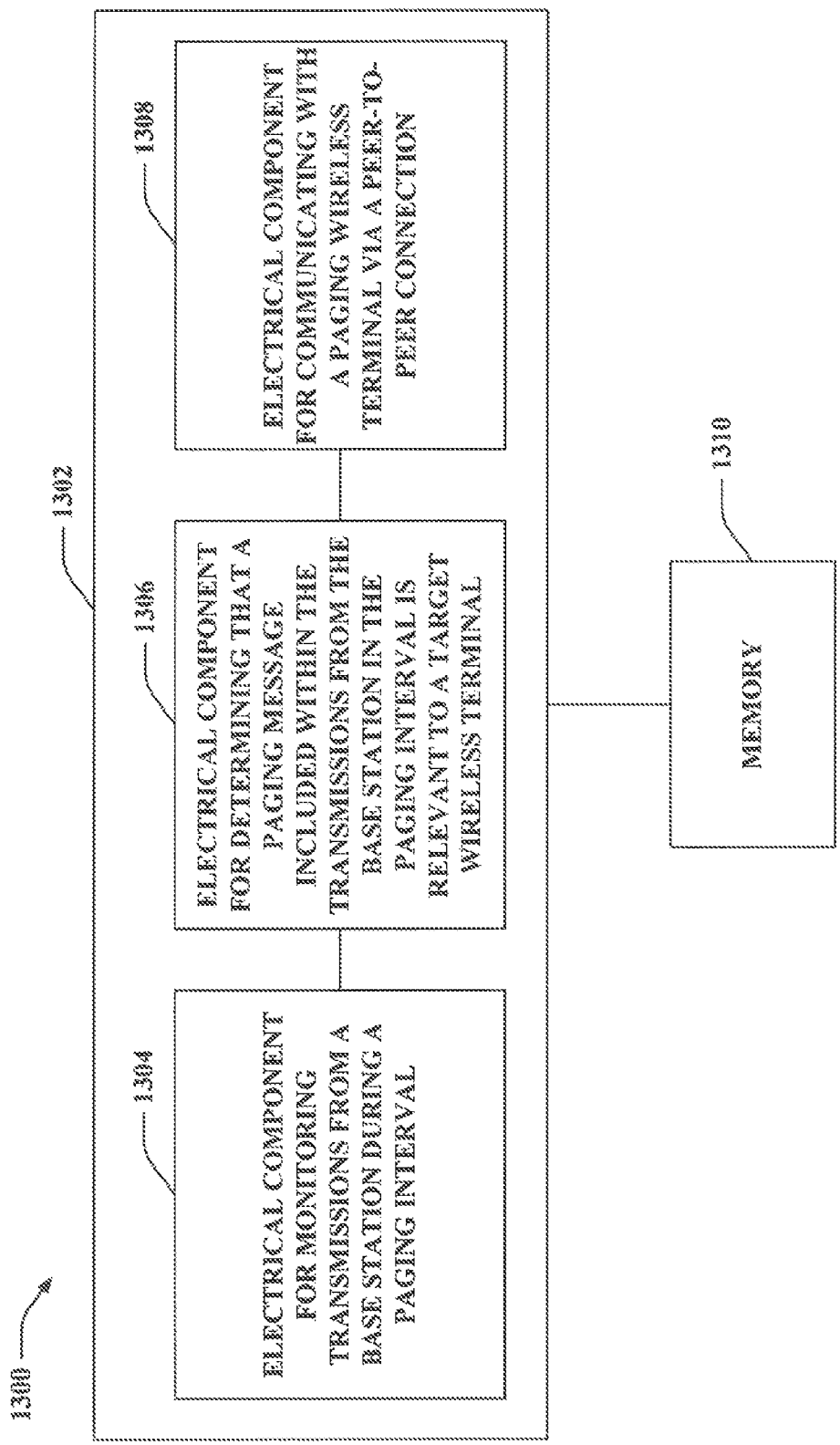
FIG. 13 is an illustration of an example system that enables being paged by a paging wireless terminal via infrastructure node(s).

With reference to FIG. 13, illustrated is a system 1300 that enables being paged by a paging wireless terminal via infrastructure node(s). For example, system 1300 may reside at least partially within a wireless terminal. It is to be appreciated that system 1300 is represented as including functional blocks, which may be functional blocks that represent functions implemented by a processor, software, or combination thereof (e.g., firmware). System 1300 includes a logical grouping 1302 of electrical components that can act in conjunction. For instance, logical grouping 1302 may include an electrical component for monitoring transmissions from a base station during a paging interval 1304. Further, logical grouping 1302 may comprise an electrical component for determining that a paging message included within the transmissions from the base station in the paging interval is relevant to a target wireless terminal 1306. The logical grouping 1302 can also include an electrical component for communicating with the paging wireless terminal via a peer-to-peer connection 1308. Additionally, system 1300 may include a memory 1310 that retains instructions for executing functions associated with electrical components 1304, 1306 and 1308. While shown as being external to memory 1310, it is to be understood that one or more of electrical components 1304, 1306 and 1308 may exist within memory 1310.

When the embodiments are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of operating a paging wireless terminal for paging a target wireless terminal via infrastructure node(s) to initiate peer-to-peer communication, comprising:
   receiving a broadcast signal from a target wireless terminal including at least one of an identifier and a network address of the target wireless terminal, the target wireless terminal transmitting the broadcast signal in a vicinity of the paging wireless terminal;
   generating a paging request for initiating direct peer-to-peer communication with the target wireless terminal;
   transmitting the paging request to a base station for routing the paging request to the target wireless terminal; and
   communicating with the target wireless terminal via a peer-to-peer connection.

2. The method of claim 1, wherein the peer-to-peer connection is a direct communication connection between the paging wireless terminal and the target wireless terminal.

3. The method of claim 1, wherein the paging request includes at least a first parameter, the method further comprising:
   determining the peer-to-peer connection as a function of the first parameter.

4. The method of claim 3, wherein the first parameter is an identifier of the peer-to-peer connection.

5. The method of claim 3, wherein the first parameter is a starting time from which the peer-to-peer connection starts between the paging wireless terminal and the target wireless terminal.

6. The method of claim 1, wherein the paging request includes at least one of the identifier and the network address of the target wireless terminal, an identifier and a network address of the paging wireless terminal.

7. The method of claim 1, further comprising transmitting traffic and control data to the target wireless terminal using the peer-to-peer connection.

8. A wireless communications apparatus, comprising:
   a memory that retains instructions related to obtaining a broadcast signal from a target wireless terminal and deriving from the broadcast signal the at least one of an identifier and a network address of the target wireless terminal, the target wireless terminal transmitting the broadcast signal in a vicinity of the paging wireless terminal, generating a paging request for initiating direct peer-to-peer communication with the target wireless terminal, transferring the paging request to a base station for routing the paging request to the target wireless terminal, and communicating with the target wireless terminal via a peer-to-peer connection; and
   a processor, coupled to the memory, configured to execute the instructions retained in the memory.

9. The wireless communications apparatus of claim 8, wherein the peer-to-peer connection is a direct communication connection between a paging wireless terminal and the target wireless terminal.

10. The wireless communications apparatus of claim 8, wherein the paging request includes at least a first parameter.

11. The wireless communications apparatus of claim 8, wherein the memory further retains instructions for determining the peer-to-peer connection as a function of the first parameter.

12. The wireless communications apparatus of claim 11, wherein the first parameter is an identifier of the peer-to-peer connection.

13. The wireless communications apparatus of claim 11, wherein the first parameter is a starting time from which the peer-to-peer connection starts between a paging wireless terminal and the target wireless terminal.

14. The wireless communications apparatus of claim 8, wherein the paging request includes at least a second parameter, the second parameter being at least one of the identifier and the network address of the target wireless terminal and an identifier and a network address of a paging wireless terminal.

15. The wireless communications apparatus of claim 8, wherein the broadcast signal is sent by the target wireless terminal, the target wireless terminal transmitting the broadcast signal to broadcast its identifier or network address to wireless terminals in a vicinity.

16. The wireless communications apparatus of claim 8, wherein the memory further retains instructions for transmitting traffic and control data to the target wireless terminal using the peer-to-peer connection.

17. A wireless communications apparatus that enables generating and transmitting paging messages for notification of direct peer-to-peer communication, comprising:
   means for receiving a broadcast signal from a target wireless terminal including at least one of an identifier and a network address of the target wireless terminal, the target wireless terminal transmitting the broadcast signal in a vicinity of the paging wireless terminal;
   means for generating a paging request for initiating direct peer-to-peer communication with the target wireless terminal;
   means for transferring the paging request to a base station for routing the paging request to the target wireless terminal; and
   means for communicating with the target wireless terminal via a peer-to-peer connection.

18. The wireless communications apparatus of claim 17, wherein the peer-to-peer connection is a direct communication connection between a paging wireless terminal and the target wireless terminal.

19. The wireless communications apparatus of claim 17, wherein the paging request includes at least a first parameter.

20. The wireless communications apparatus of claim 19, further comprising means for determining the peer-to-peer connection as a function of the first parameter.

21. The wireless communications apparatus of claim 20, wherein the first parameter is an identifier of the peer-to-peer connection.

22. The wireless communications apparatus of claim 20, wherein the first parameter is a starting time from which the peer-to-peer connection starts between a paging wireless terminal and the target wireless terminal.

23. The wireless communications apparatus of claim 17, wherein the paging request includes at least a second parameter, the second parameter being at least one of the identifier and the network address of the target wireless terminal and an identifier and a network address of a paging wireless terminal.

24. The wireless communications apparatus of claim 17, wherein the broadcast signal is sent by the target wireless terminal, the target wireless terminal transmitting the broadcast signal to broadcast its identifier or network address to wireless terminals in a vicinity.

25. The wireless communications apparatus of claim 17, further comprising means for transmitting traffic and control data to the target wireless terminal using the peer-to-peer connection.

26. A machine-readable non-transitory medium having stored thereon machine-executable instructions for:
receiving a broadcast signal in a paging wireless terminal from a target wireless terminal including at least one of an identifier and a network address of the target wireless terminal, the target wireless terminal transmitting the broadcast signal in a vicinity of the paging wireless terminal;
generating a paging request for initiating direct peer-to-peer communication with the target wireless terminal;
transmitting the paging request to a base station for routing the paging request to the target wireless terminal; and
communicating with the target wireless terminal via a peer-to-peer connection.

27. The non-transitory machine-readable medium of claim 26, wherein the peer-to-peer connection is a direct communication connection between a paging wireless terminal and the target wireless terminal.

28. The non-transitory machine-readable medium of claim 26, wherein the paging request includes at least a first parameter.

29. The non-transitory machine-readable medium of claim 28, the machine-executable instructions further comprise determining the peer-to-peer connection as a function of the first parameter.

30. The non-transitory machine-readable medium of claim 29, wherein the first parameter is an identifier of the peer-to-peer connection.

31. The non-transitory machine-readable medium of claim 29, wherein the first parameter is a starting time from which the peer-to-peer connection starts between a paging wireless terminal and the target wireless terminal.

32. The non-transitory machine-readable medium of claim 26, wherein the paging request includes at least a second parameter, the second parameter at least one of the identifier and the network address of the target wireless terminal and an identifier and a network address of a paging wireless terminal.

33. The non-transitory machine-readable medium of claim 26, wherein the broadcast signal is sent by the target wireless terminal, the target wireless terminal transmitting the broadcast signal to broadcast its identifier or network address to wireless terminals in a vicinity.

34. The non-transitory machine-readable medium of claim 26, the machine-executable instructions further comprise transmitting traffic and control data to the target wireless terminal using the peer-to-peer connection.

35. In a wireless communication system, an apparatus comprising:
a processor configured to:
receive a broadcast signal in a paging wireless terminal from a target wireless terminal including at least one of an identifier and a network address of the target wireless terminal, the target wireless terminal transmitting the broadcast signal in a vicinity of the paging wireless terminal;
generate a paging request for initiating direct peer-to-peer communication with the target wireless terminal;
transfer the paging request to a base station for routing the paging request to the target wireless terminal; and
communicate with the target wireless terminal via a peer-to-peer connection.

36. A method of operating a target wireless terminal for being paged by a paging wireless terminal via infrastructure node(s) to establish peer-to-peer communication, comprising:
transmitting a broadcast signal to wireless terminals in a vicinity including the paging wireless terminal, the broadcast signal including at least an identifier and network address of the target wireless terminal;
monitoring transmissions from a base station during a paging interval;
determining that a paging message included within the transmissions from the base station in the paging interval is relevant to the target wireless terminal; and
communicating with the paging wireless terminal via a peer-to-peer connection.

37. The method of claim 36, wherein the peer-to-peer connection is a direct communication connection between the paging wireless terminal and the target wireless terminal.

38. The method of claim 36, wherein the paging message includes at least a first parameter, the method further comprising:
determining the peer-to-peer connection as a function of said first parameter.

39. The method of claim 38, wherein the first parameter is an identifier of the peer-to-peer connection.

40. The method of claim 38, wherein the first parameter is a starting time from which the peer-to-peer connection starts between the paging wireless terminal and the target wireless terminal.

41. The method of claim 36, further comprising:
transitioning to a sleep state if it is determined that the paging message included within the transmissions from the base station in the paging interval is not relevant to the target wireless terminal; and
restraining from transmitting or receiving traffic and control data via the peer-to-peer connection.

42. The method of claim 36, determining whether the paging message is relevant to the target wireless terminal based upon a comparison between a parameter included with the paging message and an identifier of the target wireless terminal.

43. The method of claim 36, further comprising receiving traffic and control data from the paging wireless terminal using the peer-to-peer connection.

44. A wireless communications apparatus, comprising:
a memory that retains instructions related to transmitting a broadcast signal to wireless terminals in a vicinity including a paging wireless terminal, the broadcast signal including at least an identifier and network address of the target wireless terminal, monitoring transmissions from a base station during a paging interval, determining that a paging message included within the transmissions from the base station in the paging interval is relevant to a target wireless terminal, and communicating with a paging wireless terminal via a peer-to-peer connection; and
a processor, coupled to the memory, configured to execute the instructions retained in the memory.

45. The wireless communications apparatus of claim 44, wherein the peer-to-peer connection is a direct communication connection between the paging wireless terminal and the target wireless terminal.

46. The wireless communications apparatus of claim 44, wherein the paging message includes at least a first parameter.

47. The wireless communications apparatus of claim 46, wherein the memory further retains instructions for determining the peer-to-peer connection as a function of said first parameter.

48. The wireless communications apparatus of claim 47, wherein the first parameter is an identifier of the peer-to-peer connection.

49. The wireless communications apparatus of claim 47, wherein the first parameter is a starting time from which the peer-to-peer connection starts between the paging wireless terminal and the target wireless terminal.

50. The wireless communications apparatus of claim 44, wherein the memory further retains instructions for transitioning to a sleep state if it is determined that the paging message included within the transmissions from the base station in the paging interval is not relevant to the target wireless terminal and restraining from transmitting or receiving traffic and control data via the peer-to-peer connection.

51. The wireless communications apparatus of claim 44, wherein the memory further retains instructions for determining whether the paging message is relevant to the target wireless terminal based upon a comparison between a parameter included with the paging message and an identifier of the target wireless terminal.

52. The wireless communications apparatus of claim 44, wherein the memory further retains instructions for receiving traffic and control data from the paging wireless terminal using the peer-to-peer connection.

53. A wireless communications apparatus that enables being paged by a paging wireless terminal via infrastructure node(s), comprising:
means for transmitting a broadcast signal to wireless terminals in a vicinity including the paging wireless terminal, the broadcast signal including at least an identifier and network address of the target wireless terminal;
means for monitoring transmissions from a base station during a paging interval;
means for determining that a paging message included within the transmissions from the base station in the paging interval is relevant to a target wireless terminal; and
means for communicating with the paging wireless terminal via a peer-to-peer connection.

54. The wireless communications apparatus of claim 53, wherein the peer-to-peer connection is a direct communication connection between the paging wireless terminal and the target wireless terminal.

55. The wireless communications apparatus of claim 53, wherein the paging message includes at least a first parameter.

56. The wireless communications apparatus of claim 55, further comprising means for determining the peer-to-peer connection as a function of said first parameter.

57. The wireless communications apparatus of claim 56, wherein the first parameter is an identifier of the peer-to-peer connection.

58. The wireless communications apparatus of claim 56, wherein the first parameter is a starting time from which the peer-to-peer connection starts between the paging wireless terminal and the target wireless terminal.

59. The wireless communications apparatus of claim 53, further comprising:
means for transitioning to a sleep state if it is determined that the paging message included within the transmissions from the base station in the paging interval is not relevant to the target wireless terminal; and
means for restraining from transmitting or receiving traffic and control data via the peer-to-peer connection.

60. The wireless communications apparatus of claim 53, further comprising means for determining whether the paging message is relevant to the target wireless terminal based upon a comparison between a parameter included with the paging message and an identifier of the target wireless terminal.

61. The wireless communications apparatus of claim 53, further comprising means for receiving traffic and control data from the paging wireless terminal using the peer-to-peer connection.

62. A machine-readable non-transitory medium having stored thereon machine executable instructions for:
transmitting a broadcast signal to wireless terminals in a vicinity including a paging wireless terminal, the broadcast signal including at least an identifier and network address of the target wireless terminal;
monitoring transmissions from a base station during a paging interval;
determining that a paging message included within the transmissions from the base station in the paging interval is relevant to a target wireless terminal; and
communicating with the paging wireless terminal via a peer-to-peer connection.

63. The non-transitory machine-readable medium of claim 62, wherein the peer-to-peer connection is a direct communication connection between the paging wireless terminal and the target wireless terminal.

64. The non-transitory machine-readable medium of claim 62, wherein the paging message includes at least a first parameter.

65. The non-transitory machine-readable medium of claim 64, the machine-executable instructions further comprise determining the peer-to-peer connection as a function of said first parameter.

66. The non-transitory machine-readable medium of claim 65, wherein the first parameter is an identifier of the peer-to-peer connection.

67. The non-transitory machine-readable medium of claim 62, the machine-executable instructions further comprise transitioning to a sleep state if it is determined that the paging message included within the transmissions from the base station in the paging interval is not relevant to the target wireless terminal and restraining from transmitting or receiving traffic and control data via the peer-to-peer connection.

68. The non-transitory machine-readable medium of claim 62, the machine-executable instructions further comprise determining whether the paging message is relevant to the target wireless terminal based upon a comparison between a parameter included with the paging message and an identifier of the target wireless terminal.

69. The non-transitory machine-readable medium of claim 62, the machine-executable instructions further comprise receiving traffic and control data from the paging wireless terminal using the peer-to-peer connection.

70. In a wireless communication system, an apparatus comprising:
a processor configured to:
transmit a broadcast signal to wireless terminals in a vicinity including a paging wireless terminal, the broadcast signal including at least an identifier and network address of the target wireless terminal;
monitor transmissions from a base station during a paging interval;
determine that a paging message included within the transmissions from the base station in the paging interval is relevant to a target wireless terminal; and
communicate with the paging wireless terminal via a peer-to-peer connection.

71. A method that facilitates routing paging messages between peers for utilization with direct peer-to-peer communication, comprising:
transmitting a broadcast signal from a target wireless terminal to wireless terminals in a vicinity including a paging wireless terminal, the broadcast signal including at least an identifier and network address of the target wireless terminal;
receiving a paging message from the paging wireless terminal initiated based on the broadcast signal, the paging message intended for the target wireless terminal, the paging message initiates direct peer-to-peer communication between the paging wireless terminal and the target wireless terminal;
determining whether the target wireless terminal is located within an associated coverage area; and
transmitting the paging message to the target wireless terminal upon determining that the target wireless terminal is within the associated coverage area.

72. The method of claim 71, further comprising routing the paging message through a communication infrastructure to the target wireless terminal upon determining that the target wireless terminal is outside the associated coverage area.

73. The method of claim 72, wherein the communication infrastructure is associated with a home agent corresponding to the target wireless terminal, the home agent enables locating the target wireless terminal.

74. The method of claim 71, wherein the paging message includes information pertaining to a direct communication connection identifier, at least one of the identifier and the network address of the target wireless terminal, at least one of an identifier and a network address of the paging wireless terminal that generates the paging message, and/or a starting time for direct communication.

75. The method of claim 71, further comprising evaluating the paging message to decipher an identity of the target wireless terminal and determining the paging interval to transmit the paging message as a function of said identity of the target wireless terminal.

76. The method of claim 71, wherein the coverage area is associated with a base station that receives the paging message.

77. The method of claim 71, further comprising bypassing a communication infrastructure when the target wireless terminal is within the associated coverage area.

78. A wireless communications apparatus, comprising:
a memory that retains instructions related to transmitting a broadcast signal from a target wireless terminal to wireless terminals in a vicinity including a paging wireless terminal, the broadcast signal including at least a direct communication identifier of the target wireless terminal, obtaining a paging message initiated based on the broadcast signal, the paging message from the paging wireless terminal intended for the target wireless terminal, evaluating whether the target wireless terminal is positioned within an associated coverage area, and sending the paging message to the target wireless terminal upon determining that the target wireless terminal is within the associated coverage area; and
a processor, coupled to the memory, configured to execute the instructions retained in the memory.

79. The wireless communications apparatus of claim 78, wherein the paging message initiates direct peer-to-peer communication between the paging wireless terminal and the target wireless terminal.

80. The wireless communications apparatus of claim 79, wherein the paging message includes information pertaining to a direct communication connection identifier, the direct communication identifier of the target wireless terminal, a direct communication identifier of the paging wireless terminal that generates the paging message, and/or a starting time for direct communication.

81. The wireless communications apparatus of claim 79, wherein the memory further retains instructions for routing the paging message through a communication infrastructure to the target wireless terminal upon determining that the target wireless terminal is outside the associated coverage area.

82. The wireless communications apparatus of claim 81, wherein the communication infrastructure is associated with a home agent corresponding to the target wireless terminal, the home agent enables locating the target wireless terminal.

83. The wireless communications apparatus of claim 79, wherein the memory further retains instructions for determining an identity of the target wireless terminal from the paging message.

84. The wireless communications apparatus of claim 79, wherein the memory further retains instructions for bypassing a communication infrastructure when the target wireless terminal is within the associated coverage area.

85. A wireless communications apparatus that enables routing paging messages for direct peer-to-peer communication, comprising:
means for transmitting a broadcast signal from a target wireless terminal to wireless terminals in a vicinity including a paging wireless terminal, the broadcast signal including at least a direct communication identifier of the target wireless terminal;
means for obtaining a paging message initiated based on the broadcast signal, the paging message from the paging wireless terminal directed to the target wireless terminal;
means for determining whether the target wireless terminal is within a corresponding coverage area; and
means for routing the paging message to the target wireless terminal according to the determination to enable direct peer-to-peer communication between the paging wireless terminal and the target wireless terminal.

86. The wireless communications apparatus of claim 85, wherein the paging message includes information pertaining to a direct communication connection identifier, the direct communication identifier of the target wireless terminal, a direct communication identifier of the paging wireless terminal that generates the paging message, and/or a starting time for direct communication.

87. The wireless communications apparatus of claim 85, further comprising means for directly transferring the paging message to the target wireless terminal when the target wireless terminal is determined to be within vicinity.

88. The wireless communications apparatus of claim 85, further comprising means for indirectly transferring the paging message to the target wireless terminal via a communication infrastructure when the target wireless terminal is determined to be outside of the coverage area.

89. The wireless communications apparatus of claim 85, further comprising means for deciphering an identity of the target wireless terminal from the paging message.

90. A machine-readable non-transitory medium having stored thereon machine-executable instructions for:
transmitting a broadcast signal from a target wireless terminal to wireless terminals in a vicinity including a paging wireless terminal, the broadcast signal including at least a direct communication identifier of the target wireless terminal;
receiving a paging message initiated based on the broadcast signal, the paging message from the paging wireless terminal intended for the target wireless terminal, the paging message initiates direct peer-to-peer communication between the paging wireless terminal and the target wireless terminal;
determining whether the target wireless terminal is located within an associated coverage area; and
transmitting the paging message to the target wireless terminal upon determining that the target wireless terminal is within the associated coverage area.

91. The non-transitory machine-readable medium of claim 90, wherein the paging message includes information pertaining to a direct communication connection identifier, the direct communication identifier of the target wireless terminal, a direct communication identifier of the paging wireless terminal that generates the paging message, and/or a starting time for direct communication.

92. The non-transitory machine-readable medium of claim 90, the machine-executable instructions further comprise routing the paging message through a communication infrastructure to the target wireless terminal upon determining that the target wireless terminal is outside the associated coverage area.

93. The non-transitory machine-readable medium of claim 92, wherein the communication infrastructure is associated with a home agent corresponding to the target wireless terminal, the home agent enables locating the target wireless terminal.

94. The non-transitory machine-readable medium of claim 90, the machine-executable instructions further comprise evaluating the paging message to decipher an identity of the target wireless terminal.

95. The non-transitory machine-readable medium of claim 90, the machine-executable instructions further comprise bypassing a communication infrastructure when the target wireless terminal is within the associated coverage area.

96. In a wireless communication system, an apparatus comprising:
a processor configured to:
transmit a broadcast signal from a target wireless terminal to wireless terminals in a vicinity including a paging wireless terminal, the broadcast signal including at least a direct communication identifier of the target wireless terminal;
receive a paging message initiated based on the broadcast signal, the paging message from the paging wireless terminal directed to the target wireless terminal;
determine whether the target wireless terminal is within a corresponding coverage area; and
route the paging message to the target wireless terminal according to the determination to enable direct peer-to-peer communication between the paging wireless terminal and the target wireless terminal.

* * * * *